United States Patent
Kovalsky et al.

(10) Patent No.: US 8,275,204 B1
(45) Date of Patent: Sep. 25, 2012

(54) ESTIMATION OF JOINT RADIOMETRIC AND GEOMETRIC IMAGE DEFORMATIONS

(76) Inventors: Shahar Kovalsky, Kfar Yona (IL); Rami Hagege, Beer Sheva (IL); Joseph M. Francos, Lehavim (IL)

( * ) Notice: Subject to any disclaimer, the term of this patent is extended or adjusted under 35 U.S.C. 154(b) by 104 days.

(21) Appl. No.: 12/492,024

(22) Filed: Jun. 25, 2009

Related U.S. Application Data

(63) Continuation-in-part of application No. 12/177,669, filed on Jul. 22, 2008, now Pat. No. 7,865,020, which is a continuation of application No. 10/981,943, filed on Nov. 5, 2004, now Pat. No. 7,406,197.

(60) Provisional application No. 61/076,078, filed on Jun. 26, 2008, provisional application No. 61/076,084, filed on Jun. 26, 2008, provisional application No. 60/518,006, filed on Nov. 5, 2003, provisional application No. 60/604,745, filed on Aug. 25, 2004.

(51) Int. Cl.
G06K 9/62 (2006.01)
G06K 9/68 (2006.01)
G06K 9/32 (2006.01)
G06K 9/36 (2006.01)

(52) U.S. Cl. ......... 382/209; 382/218; 382/294; 382/284
(58) Field of Classification Search .................. 382/209, 382/218, 284, 294
See application file for complete search history.

(56) References Cited

U.S. PATENT DOCUMENTS

| | | | |
|---|---|---|---|
| 5,469,512 A | 11/1995 | Fujita et al. |
| 6,574,353 B1 | 6/2003 | Schoepflin et al. |
| 6,748,112 B1 | 6/2004 | Nguyen et al. |
| 2002/0181782 A1 | 12/2002 | Monden |

OTHER PUBLICATIONS

Candocia, Jointly Registering Images in domain and Range by Piecewise Linear comparametric analysis, IEEE Transactions on Image Processing, Apr. 2003, pp. 409-419.*
Miller, M. and Younes, L., "Group Actions, Homeomorphisms, and Matching: A General Framework," *Int. Jou. Comp. Vision*, vol. 41, pp. 61-84, 2002.
Younes, L., Tutorial: Deformation, Warping and Object Comparision, Proc. ECCV, Jul. 7, 2000.
Lucchese, L., "A Frequency Domain Technique Based on Energy Radial Projections for Robust Estimation of Global 2D Affine Transformations," *Computer Vision and Image Understanding*, vol. 81, pp. 72-116, Feb. 2001.
Kybic, J. and Unser, M., "Fast Parametric Elastic Image Registration," *IEEE Trans. Image Proc.*, vol. 12, pp. 1427-1442, Nov. 2003.

* cited by examiner

*Primary Examiner* — John Strege
(74) *Attorney, Agent, or Firm* — Pillsbury Winthrop Shaw Pittman; David Jaffer

(57) ABSTRACT

Methods for estimating joint geometric and radiometric deformations relating two observations of the same object provide methods for identifying and matching images (as in face recognition) and for characterizing and determining the relationship between a pair of observations (as in target recognition).

6 Claims, 8 Drawing Sheets

ESTIMATION OF JOINT RADIOMETRIC AND GEOMETRIC IMAGE DEFORMATIONS

RELATED APPLICATIONS

This application claims the benefit of U.S. Provisional Patent Application Ser. No. 61/076,078 filed Jun. 26, 2008, and U.S. Provisional Patent Application Ser. No. 61/076,084, filed Jun. 26, 2008, and is a continuation-in-part of U.S. patent application Ser. No. 12/177,669, filed Jul. 22, 2008 now U.S. Pat. No. 7,865,020, which is a continuation of U.S. patent application Ser. No. 10/981,943, filed Nov. 5, 2004 (now U.S. Pat. No. 7,406,197) which claims the benefit of U.S. Provisional Patent Application Ser. No. 60/518,006, filed Nov. 5, 2003 and U.S. Provisional Patent Application Ser. No. 60/604,745 filed Aug. 25, 2004. These foregoing applications are hereby incorporated by reference.

FIELD OF INVENTION

The present invention relates to methods for estimating joint geometric and radiometric images deformations relating two observations of the same object.

BACKGROUND OF THE INVENTION

Understanding different appearances of an object is an elementary problem in various fields. Since acquisition conditions vary (e.g., pose, illumination, acquisition system), the set of possible observations on a particular object is immense; therefore, the complicated task of characterizing and determining the relation between a pair of observations is crucial whether one is after the differences themselves (e.g., target tracking) or whether the interest is restricted to determining if two observations are of the same object (e.g., face recognition).

Image registration, and in general the problem of estimating transformations of observed objects, has been intensively studied for several decades. Results of this research have been applied in various fields such as remote sensing, medical imaging and computer vision, and to problems such as super-resolution, video compression, and many more.

The vast majority of studies focus on geometric-only registration; that is, alignment of the domain (coordinates) of images. Correspondingly, the term "registration" is commonly associated with geometry, which indeed is a challenging problem in itself. Intuitively, it seems that the simplest way to relate a pair of geometrically deformed images is by associating ordered sequences of some salient features, that can be located on both images (feature-based methods). These are usually selected to be line or point features, and thus, much of the intensity information contained in the image is discarded. To make this approach feasible, the problem of finding the correspondence between the features on both images must be solved first. Therefore, this approach may only be used when the features are easily detectable, the deformation is close enough to the identity, the number of features is relatively small (yet large enough to allow for a meaningful estimation), and there is a strong contextual evidence to guide the solution to the correspondence problem. Yet, in many problems the feature points are not easily identifiable and their number may be large, in which case the correspondence problem rapidly becomes very difficult to solve.

Featureless methods (area methods) avoid the correspondence problem by directly employing the intensity information of the image in order to establish an estimate of the geometric deformation, without identifying any features. Among such methods are those based on "correlation-like", Fourier, mutual information and optical flow principles. Typically, these methods lead to the utilization of some iterative optimization procedure in order to estimate the deformation. As such, they are applicable only when the deformations are small, which lowers the risk of obtaining a local minimum as the solution. Explicit solution methods, which do not employ the minimization of a penalty function of some sort, are commonly restricted to a relatively small family of transformations. For example, there are explicit methods in the cases of translation only, rotation only, or scale only, but the solution becomes (partially) optimization based once combinations of translation, rotation and scaling are introduced.

On the other hand, various recent studies have focused on radiometry-only registration; that is, alignment of the range (values/intensities) of geometrically-aligned images. This problem is much simpler since images are geometrically pre-aligned, and thus pointwise correspondence inherently exists. Thus, straightforward methods may be used to combine images captured in different optical settings into a single image of high dynamic range (HDR).

Nonetheless, it seems that the problem of deriving a registration procedure in the presence of combined radiometric and geometric variations (i.e., both domain and range) has received much less attention. In this case, employing geometric registration methods without taking the radiometric variation into account is clearly far from optimal: featureless geometric registration methods are extremely sensitive to intensity variations and typically fail in the presence of some non-negligible radiometric transformation relating the intensities of the observations. This therefore leaves feature-based methods as a sole option, since they are less sensitive to radiometric variations. These methods, however, are not always applicable, as mentioned above. For example, in medical imaging, cross-modality geometric registration procedures are prone to failure due to significant, difficult-to-model, differences in pixel (voxel) intensities; this has led researchers to the employment of various computationally demanding variational methods for performing the registration. In the geometric registration of optical imaging, it is customary to evade the radiometric effects by using "radiometry-invariant" procedures (usually feature-based, as previously mentioned). The physical understandings and invariancy principles of the color constancy framework have also been utilized in attempt to minimize the effects of such radiometric variations (these, however, usually assume linear radiometric effects). Another approach, that relies on the principals of the aforementioned radiometry-only registration, overcomes radiometric phenomena in the registration of optical images (and, in fact, benefits from it) by using special optical apparatus (spatially varying filters attached to the camera).

SUMMARY OF THE INVENTION

The present invention is concerned with the problem of estimating joint geometric and radiometric image deformations. Observations of an object are assumed to simultaneously undergo an affine transformation of coordinates and a non-linear mapping of the intensities.

In the geometric aspect, the case of affine transformations of coordinates is basic and provides a "first-order" approximation to more complex cases (such as "small" projective deformations, etc.). As such, registration of images subject to geometric affine transformation has gained significant interest. In the radiometric aspect, the type of global variability we consider is often referred to as intensity mapping. It naturally appears in the important case of single-modal registration, where non-linearities are typically introduced by an image acquisition system as the overall non-linearity of its various components (sensors, amplifiers, etc.). In optical imaging, for example, such non-linearities are characterized by the camera response function (CRF). Notably, such non-linearities are sometimes deliberately introduced in hardware design for various reasons. It has also been suggested that this type of global mapping may model the intensity variations in certain medical imaging multi-modal schemes.

More specifically, let $g: R^m \to R$ be a function, representing a multi-dimensional signal (e.g., m=2 in the case of images). Consider an observation h on g of the form $h(x)=Q(g(A(x)))$, where Q is invertible and A is affine. The right-hand composition of g with A (composition from within) can be thought of as a spatial/time deformation (i.e., a deformation of the domain—the coordinate system), while its left-hand composition with Q (composition from without) can be seen as a memoryless non-linear input/output system applied to the signal's amplitude. Hence, in terms of image formation, such model physically corresponds to a simultaneous deformation of both geometry and radiometry. It should also be mentioned that in this case, the set of allowed deformations we consider, naturally takes the convenient structure of a (product) group. Taking this point of view, in the absence of noise, the joint registration problem is formulated as follows: given two functions (images/signals) g and h, we are to find, if one exists, a pair (Q,A) such that $h(x)=Q(g(A(x)))$.

As previously mentioned, the difficulty of the joint geometric-radiometric estimation problem lead to the current state where only a few attempts have been made to solve it. The lack of point-wise correspondence (due to the geometric transformation) and the lack of intensity-wise alignment (due to the radiometric mapping) does not allow for a simple direct usage of the intensity information of the images. Seemingly, the geometric and radiometric problems are strongly coupled and may not be answered separately. As such, straightforward approaches for solving this problem typically lead to a high-dimensional non-linear non-convex optimization problem. Only a few works have explicitly modeled joint geometric-radiometric deformations. Indeed, among these, most evade the inherent non-linearity of this estimation problem through linear approximation and/or a variational optimization-based approaches.

An exception is the work of Candocia, whereby the joint registration of images in domain as well as range is accomplished using piecewise linear comparametric analysis; the camera's non-linear comparametric function is approximated with a constrained piecewise linear model; the registration model is then expanded using a first order Taylor expansion (of the image), resulting in a linear estimation problem. Being based on first order Taylor expansion, such solutions are restricted by the (implicit) assumptions of small geometric deformations and differentiability of the images, required for the approximation to be reasonable. Although such assumptions may sometimes be acceptable (for example, in the mosaicing of an image sequence shown as an example in F. M. Candocia, Jointly registering images in domain and range by piecewise linear comparametric analysis, *IEEE Transactions on Image Processing,* 12(4):409-419, April 2003), they are restrictive in general; an attempt to employ a Taylor based solution in the presence of a large geometric transformation (e.g., the simple case of a 180 degrees rotation) will certainly fail. Furthermore, even when such methods may be employed, the solution is approximated.

The present invention provides a method for solving the joint estimation problem in terms of an equivalent linear estimation problem. In contrast to many featureless estimation methods, and in contrast with the joint registration method proposed by Candocia, the method we describe is neither approximation-based nor does it have strong assumptions on the model (e.g., differentiability of the images). Also, no assumptions are made as to the magnitude of the geometric and radiometric deformations relating the observations. The solution we propose is explicit and thus computationally efficient. Moreover, in the absence of noise it is shown to be exact (not approximated), regardless of the deformations' magnitudes.

Below we rigorously formulate the problem addressed in this disclosure. We then discuss the problem in the absence of noise; the underlying algebraic structure of the problem and the notion of sample distribution are exploited in order to decouple the problem into two independent estimation problems: one for the unknown radiometric deformation and the other for the unknown geometric deformation. Each of those is then equivalently reformulated as a linear estimation problem. We then illustrate the estimation scheme using a synthetic example.

DETAILED DESCRIPTION OF THE INVENTION

1(a) Statement of the Problem

Figure 1:
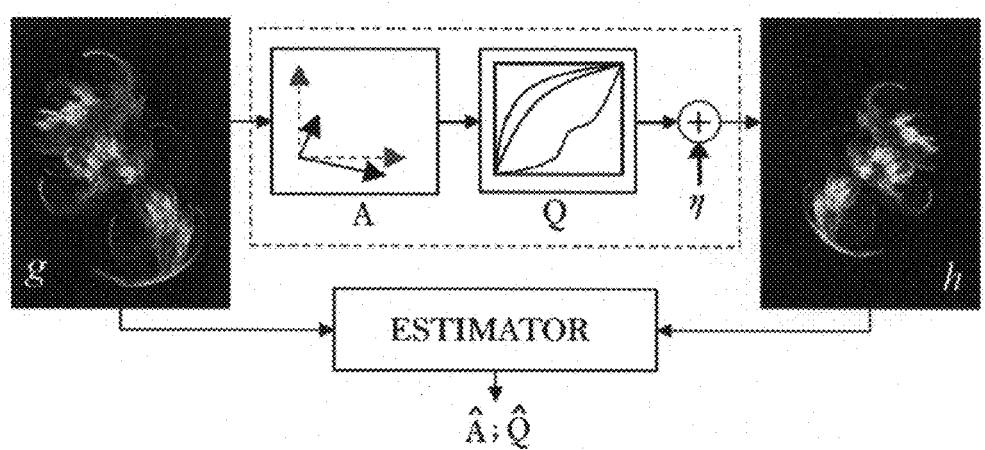
FIG. 1 illustrates the problem description (where different non-linear intensity mappings are associated with each of the color channels of the image).

We begin by informally stating the problem. Suppose we are given a single observation h, about a known m-dimensional signal g, of the form $$h(x)=Q(g(A(x)))+\eta(x),$$

where Q a non-linear mapping of the intensities (radiometry); A is an affine (geometric) transformation; and η is an additive noise. We study the problem of estimating the joint radiometric and geometric deformations, which amounts to the estimation of Q and A, as illustrated by the simple block diagram presented in FIG. 1.

More formally, let $A:R^m \to R^m$ be an affine transformation of coordinates, that is, $A:x \mapsto Ax+c$ where $A \in R^{m \times m}$ is non-singular and $c \in R^m$. A shall represent the geometric deformation. Let $Q:R \to R$ be an increasing invertible function, representing the non-linear radiometric deformation. Let us further assume that $Q(0)=0$.

Denote by $B_c(R^m)$ the space of bounded, compactly supported, Lebesgue measurable functions from $R^m$ to R. Let $g \in B_c(R^m)$ and let $\{\eta(x):x \in R^m\}$ be a real-valued i.i.d. random field with a known distribution function $F_\eta$.

Throughout, we shall use ∘ to denote the composition of functions, and supp{f} shall be used to denote the support of a function f, i.e., the closure of the set where f does not vanish. With these notations, the problem addressed is the following: Given the known function g and a single measurement (observation) h of the form $$h(x)=[Q \circ g \circ A](x)+\eta(x) \quad (1.1)$$

for all $x \in supp\{Q \circ g \circ A\}$, find an estimate for the left-hand composition Q and the affine transformation A.

Remark 1. The restriction $x \in supp\{Q \circ g \circ A\}$ may be interpreted as the assumption of a known segmentation.

Remark 2. An important special case of (1.1) is the additive white Gaussian noise (AWGN) model, where $\{\eta(x):x \in R^m\}$ is also assumed to be zero mean Gaussian with a known variance $\sigma_\eta^2$.

Remark 3. Since Q is invertible, the recovery (estimation) of Q or of its inverse $Q^{-1}$ are equivalent. Similarly, estimating A or $A^{-1}$ are equivalent.

1(b) The Noiseless Case

In this section we discuss the noiseless case, that is, where $\eta \equiv 0$ in (1.1). Hence, the problem model becomes $$h = Q \circ g \circ A, \quad (1.2)$$

where to simplify the notations we omit the argument of the functions.

In the following, we show that the joint problem may be decoupled into two simpler problems in the unknown left-hand composition Q and affine transformation A, respectively.

In order to do so, let us first introduce the basic transformation studied throughout this discussion. Denote by λ the Lebesgue measure on $R^m$, the m-dimensional Euclidean space. We define the sample distribution transformation T on $B_c(R^m)$ by $$[Th](t) = \frac{\lambda\{x \in supp\{h\}: h(x) \leq t\}}{\lambda\{supp\{h\}\}}, \quad h \in B_c(R^m). \quad (1.3)$$

The sample distribution may be thought of as a continuous "cumulative histogram" of a function. The next simple lemma demonstrates the role of T as a "distribution" transformation and elaborates on some of its properties with respect to certain right- and left-hand compositions.

Lemma 1. For a given function $g \in B_c(R^m)$, the following statements hold:

1. The function $G(t)=[Tg](t)$ is a distribution function. Furthermore, the support of the distribution G(t) is bounded, in the following sense:
    (a) $G(t)=0$ for $t<\inf_x g(x)$.
    (b) $G(t)=1$ for $t>\sup_x g(x)$.
2. T is invariant under right-hand affine compositions: $T(g \circ A)=Tg$ for any non-singular affine transformation $A:R^m \to R^m$.
3. $T(W \circ g)=[Tg] \circ W^{-1}$ for any strictly increasing continuous function $W:R \to R$ such that $W(0)=0$.

Proof. Part (1) is immediate. Notice that $supp\{h \circ A\}=A^{-1}(supp\{h\})$; this is simply since $\{x:h(A(x))=0\}=\{A^{-1}(y): h(y)=0\}$. Thus, using the properties of the Lebesgue measure, we have $$\lambda\{supp\{h \circ A\}\}=\lambda\{A^{-1}(supp\{h\})\}=|A^{-1}|\lambda\{supp\{h\}\},$$

where $|A^{-1}|$ denotes the determinant of the transformation $A^{-1}$. Next, notice that T admits the following equivalent integral form $$[Th](t) = \frac{1}{\lambda\{supp\{h\}\}} \int_{supp\{h\}} [\chi_{(-\infty,t]} \circ h](x) d\lambda(x). \quad (1.4)$$

Set $y=A(x)$, thus $x=A^{-1}(y)$ and $d\lambda(x)=|A^{-1}|d\lambda(y)$. Hence, by (1.4) and a change of variables, we have $$[T(h \circ A)](t) = \frac{1}{\lambda\{supp\{h \circ A\}\}} \int_{supp\{h \circ A\}} \chi_{(-\infty,t]}(h(A(x))) d\lambda(x)$$

$$= \frac{1}{|A^{-1}|\lambda\{supp\{h\}\}} \int_{supp\{h\}} \chi_{(-\infty,t]}(h(y))|A^{-1}|d\lambda(y) =$$

$$[Th](t)$$

for all t, and thus (2) is proved. Lastly, since W is strictly increasing and $W(0)=0$ we have that $supp\{W \circ h\}=supp\{h\}$. Hence, for all t we have $$[T(W \circ h)](t) = \frac{\lambda\{x \in supp\{W \circ h\}:[W \circ h](x) \leq t\}}{\lambda\{supp\{W \circ h\}\}}$$

$$= \frac{\lambda\{x \in supp\{h\}: h(x) \leq W^{-1}(t)\}}{\lambda\{supp\{h\}\}} =$$

$$[[Th] \circ W^{-1}](t),$$

thus (3) is proved.

In the following we show that properties (2) and (3) above are the key in enabling an elegant solution to the joint registration problem. The next two subsections present two complementary approaches, in which either the radiometry, Q, or the geometry, A, is first estimated.

1(b)(i) Radiometry-First Approach

In this subsection, by directly employing the properties of the transformation T, a radiometry-first estimation scheme is derived. By simply applying T to the (noiseless) relation (1.2) and using the above properties, we obtain the following functional relation $$Th = T(Q \circ g \circ A) = T(Q \circ g) = [Tg] \circ Q^{-1}. \tag{1.5}$$

Hence, the following corollary may be stated:

Corollary 2. Let $H(t)=[Th](t)$ and $G(t)=[Tg](t)$. Then, for all $t \in R$ the following relation holds $$H(t) = [G \circ Q^{-1}](t) = G(Q^{-1}(t)). \tag{1.6}$$

We thus conclude that the functions H and G are related by a right-hand composition $Q^{-1}$. Hence, using the transformation T we have "converted" a functional relation expressed by a left-hand composition (i.e., "radiometric deformation") into a new functional relation expressed by a right-hand composition (i.e., "geometric deformation"). In fact, equation (1.6) describes a new, one-dimensional, "time-domain" registration problem. Hence, any suitable (parametric or non-parametric) registration method may be used to recover (estimate) $Q^{-1}$.

"Time-domain" registration problems of the type (1.6) have gained substantial interest in many research fields. Considered as key problems (for example in speech or handwriting recognition), many solution methods have been proposed. As such, these methods (e.g., DTW and modified-DTW) may be used as is, or with minimal adaptation, in order to solve for in the above case. Commonly, however, these methods typically lead to optimization-based techniques.

Nevertheless, moment-like non-linear functionals may be utilized to produce linear constraints on Q. Thus, enabling the explicit recovery of $Q^{-1}$ in terms of solving a linear system of equations.

Namely, suppose that Q is also continuously differentiable. In this case, (1.6) is an estimation problem of the form considered in J. M. Francos, R. Hagege, and B. Friedlander, Estimation of multidimensional homeomorphisms for object recognition in noisy environments, *Signals, Systems and Computers*, 2003. *Conference Record of the Thirty-Seventh Asilomar Conference on*, 2:1615-1619, 2003. However, since H and G are distribution functions, they are not compactly supported (as functions). Thus, further "compactification" is required in order to employ the method proposed in Francos et al. for the estimation of homeomorphic deformations of compactly supported signals.

Let $\epsilon > 0$ be some arbitrarily small number and define $$c_\varepsilon(t) = \begin{cases} t, & t < 1 - \varepsilon \\ 0, & \text{elsewhere} \end{cases} \tag{1.7}$$

Next, let $\tilde{H} = c_\varepsilon \circ H$ and $\tilde{G} = c_\varepsilon \circ G$. By left composing $c_\varepsilon$ on both sides of (1.6), we find that $$\tilde{H} = c_\varepsilon \circ H = c_\varepsilon \circ (G \circ Q^{-1}) \tag{1.8}$$

$$= (c_\varepsilon \circ G) \circ Q^{-1} = \tilde{G} \circ Q^{-1}.$$

Thus, $\tilde{H}$ and $\tilde{G}$ are bounded, compactly supported, Lebesgue measurable functions from R to itself, related by the right-hand composition $Q^{-1}$, which, by assumption, has a continuously differentiable inverse.

Let $\{e_i\}$ be a countable basis of $L_2(\text{supp}\{\tilde{H}\})$. Since, by assumption Q' is continuous, it is in $L_2(\text{supp}\{\tilde{H}\})$ and can be represented as $$Q'(t) = \sum_i b_i e_i(t). \tag{1.9}$$

Using the estimation algorithm proposed in [20], any finite order model of the type (1.9) can now be solved for the coefficients $\{b_i\}$ by means of solving a system of linear equations.

Namely, let $w: R \to R$ be a Lebesgue measurable function that vanishes at zero. By applying w to (1.8) as left composition and integration we obtain $$\int_R w(\tilde{H}(t)) dt = \int_R w(\tilde{G}(Q^{-1}(t))) dt. \tag{1.10}$$

By the change of variables $\tau = Q^{-1}(t)$, we have $dt = Q'(\tau) d\tau$. Hence, using the parameterization (1.9), under the finite sum assumption, we find that $$\int_R w(\tilde{G}(Q^{-1}(t))) dt = \int_R w(\tilde{G}(\tau)) Q'(\tau) d\tau = \sum b_i \int_R e_i(\tau) w(\tilde{G}(\tau)) d\tau. \tag{1.11}$$

If so, for any choice of function $w: R \to R$ a linear constraint in the unknown parameters $\{b_i\}$ may be constructed as follows $$\int_R w \circ \tilde{H} = \left[ \int_R e_1(w \circ \tilde{G}) \ldots \int_R e_M(w \circ \tilde{G}) \right] \begin{bmatrix} b_1 \\ \vdots \\ b_M \end{bmatrix}, \tag{1.12}$$

where M is the model order of the expansion of Q' in (1.9).

Choosing w's that produce linearly independent constraints lets us establish a linear system of equations in the parameters $\{b_i\}$. It is possible to show that different w's are "almost always" linearly independent, yielding an exact solution for Q' in the absence of noise; in fact, a method for optimal selection of such constraints in the presence of model mismatch (with respect to prescribed optimality criteria) can be derived.

Lastly, since $Q(0)=0$, Q can be easily obtained by integration, which completes the estimation of the mapping Q.

Based on the conclusions in Francos et al. we conclude that if the derivative of Q admits a finite order representation in the form of (1.9), the solution for the radiometric deformation Q is completely determined and exact.

Once the radiometric deformation Q (or equivalently its inverse $Q^{-1}$) is recovered, (1.2) may be rewritten as $$h = \underbrace{(Q \circ g)}_{known} \circ A. \tag{1.13}$$

Hence, the problem reduces to a strictly geometric problem, where A may be recovered (see further discussion in 1(b)(iii) below).

1(b)(ii) Geometry-First Approach

In this subsection, the properties of the transformation T given in Lemma 1 are used to derive a geometry-first estimation scheme. As previously shown, T converts the joint problem (1.2), in the unknowns Q and A, to a "new" problem in a single unknown, $Q^{-1}$. In order to obtain a symmetric result in A, let us define an auxiliary operator R on $B_c(R^m)$ by $$Rh=[Th]\circ h-[Th](0).$$

Next, apply R to the basic (noiseless) relation $h=Q\circ g\circ A$ given in (1.2). Notice that $[Th](0)$ is a constant function (over all of $R^m$), and thus $[Th](0)\circ A=[Th](0)$. Hence, by employing Corollary 1.2 and since $Q(0)=0$ we have $$Rh = [Th]\circ h - [Th](0) = \qquad (1.14)$$
$$([Tg]\circ Q^{-1})\circ (Q\circ g\circ A) - [Tg](Q^{-1}(0)) = [Tg]\circ g\circ A - [Tg](0) =$$
$$([Tg]\circ g - [Tg](0))\circ A = [Rg]\circ A.$$

Thus, the following corollary may be stated:
Corollary 3. Let $H(x)=[Rh](x)$ and $G(x)=[Rg](x)$. Then, for all $x \in R^m$ the following relation holds $$H(x)=[G\circ A](x)=G(A(x)). \qquad (1.15)$$

Hence, R (which has been defined in terms of T) has converted the joint problem (1.2), in the unknowns Q and A, to a "new" problem in a single unknown, A.

We thus conclude that the functions H and G are related by a right-hand composition A. Hence, by applying the operator R we have eliminated the left composition Q, representing the radiometric deformation, in the basic relation (1.2). If so, equation (1.15) describes a new, strictly geometric, affine registration problem. Hence, any suitable registration method may be used to recover (estimate) A.

As mentioned above, geometric-only registration, i.e., the problem of registering signals that vary by transformations of the domain, is a field of active research. In particular, a vast number of methods have been proposed in the (fundamental) case of affine geometric transformations. As with the case of "time-domain" registration problems, discussed above, each of these methods may be used, as is or with minimal adaptation, in order to solve for A in the above case.

Whereas the majority of the solution methods are either approximate or optimization-based, only a few explicit linear methods have been proposed. In particular, in R. Hagege and J. M. Francos, Parametric estimation of two-dimensional affine transformations, *Acoustics, Speech, and Signal Processing,* 2004. *Proceedings. (ICASSP '04). IEEE International Conference on,* 3:iii-305-308, 2004, it is shown that (1.15) may be reformulated as a linear system of equations in A. The method derived in Hagage, et al. resembles the method discussed in above for the parametric estimation of homeomorphisms; for the completeness of the discussion, its outline is given as follows:

Let $A(x)=Ax+c$. For now, let us assume that $|A|=\det(A)=k$ is known. Let $w:R\to R$ be a measurable function that vanishes at zero. By applying w to (1.15) as left composition, multiplication by x and integration (as in the calculation of a first order moment) we obtain $$\int_{R^m} xw(H(x))dx = \int_{R^m} xw(G(Ax+c))dx. \qquad (1.16)$$

Denote $b=-A^{-1}c$. By the change of variables $y=Ax+c$, we have $x=A^{-1}y+b$ and $dx=|A^{-1}|dy=k^{-1}dy$ (recall that $|A|=k$), yielding $$\int_{R^m} xw(G(Ax))dx = \int_{R^m} (A^{-1}y+b)w(G(y))k^{-1}dy = \qquad (1.17)$$
$$k^{-1}A^{-1}\int_{R^m} yw(G(y))dy + k^{-1}b\int_{R^m} w(G(y))dy.$$

By putting (1.17) in matrix form, it is clear that for any choice of function $w:R\to R$ a linear constraint in the unknown entries of $A^{-1}$ and b may be constructed as follows $$k\underbrace{\int_{R^m} x(w\circ H)}_{\substack{m\times 1\\known}} = \underbrace{[A^{-1}\ b]}_{\substack{m\times (m+1)\\unknown}} \cdot \underbrace{\begin{bmatrix}\int_{R^m} x(w\circ G)\\ \int_{R^m}(w\circ G)\end{bmatrix}}_{\substack{(m+1)\times 1\\known}}. \qquad (1.18)$$

Choosing w's that produce linearly independent constraints lets us establish a linear system of equations in the entries of $A^{-1}$ and b. It is possible to show that different w's are "almost always" linearly independent, yielding an exact solution in the absence of noise; in fact, as mentioned before, a method for optimal selection of such constraints in the presence of model mismatch (with respect to prescribed optimality criteria) is derived in R. Hagege and J. M. Francos, Parametric estimation of multi-dimensional affine transformations in the presence of noise: a linear solution, In *Proc. IEEE/SP* 13*th Workshop on Statistical Signal Processing,* pages 55-58, 2005 (the details are out of the scope of this work).

Relaxing the assumption that $|A|=k$ is known is straightforward: again, by simply changing variables, it is easy to see that for any measurable function $w:R\to R$ that vanishes at zero we have $$|A| = \frac{\int_{R^m} w\circ G}{\int_{R^m} w\circ H}. \qquad (1.19)$$

Hence, $|A|=k$ may be calculated in advance.
Once the geometric transformation A is determined, (1.2) may be rewritten as $$h = Q\circ \underbrace{(g\circ A)}_{known}. \qquad (1.20)$$

Hence, the problem reduces to a strictly radiometric problem, where Q may be recovered (see further discussion in 1(b)(iii) below).

1(b)(iii) Joint Registration—Concluding Results

This short subsection concludes the results derived for solving the problem of joint registration in the case of noiseless measurement. In 1(b)(i) and 1(b)(ii) above we have presented two complementary approaches for recovering the unknown radiometric and geometric transformations from the joint problem. These are summarized as follows:

Recall that the noiseless joint registration problem is $$h=Q\circ g\circ A,$$

where the unknowns are Q and A. Using the transformations T and R (which is defined in terms of T) it is possible to symmetrically decouple this problem into two strictly geometric problems in each of the unknowns (Corollaries 2 and 3):

$$[Th] = [Tg] \circ Q^{-1},$$

$$[Rh] = [Rg] \circ A.$$

Hence, a solution to the joint problem may be obtained by separately solving the latter two problems for the unknowns $Q^{-1}$ and A, respectively. Accordingly, explicit parametric solution methods, compatible with either the estimation of $Q^{-1}$ or A, have been presented. It has been also noted that once one of these new problems is solved, the original problem may be reduced to a radiometric- or geometric-only problem—again solvable by the same means.

Moreover, if the conditions in 1(b)(i) and 1(b)(ii) are satisfied, the overall solution for both the geometric and the radiometric deformations, Q and A, is completely determined and exact (i.e., not approximated), regardless of its magnitude.

1(b)(iv) The Noiseless Case—Numerical Example

Figure 2:
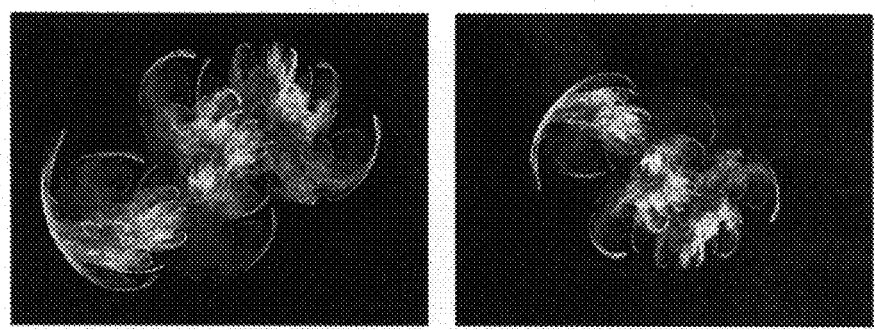
FIG. 2 shows "flaming fractals": the template image g (left) and the observation image h (right).

The following synthetic example illustrates the estimation scheme derived in the previous section for the noiseless joint geometry-radiometry estimation problem. In this example, g and h are the two-dimensional RGB images of a "flaming fractal" shown in FIG. 2. Both images are of dimensions 1188×891 and the values of each channel are in the range of [0,1].

According to the noiseless model (1.2), the observation image, h, is a version of the template image, g, subject to both geometric and radiometric deformations. The geometric deformation, an affine transformation of coordinates, was chosen to be $$A = \begin{bmatrix} 1.3 & 0.3 \\ 0.1 & -1.3 \end{bmatrix}; \quad c = \begin{bmatrix} 0 \\ 0 \end{bmatrix}$$

The radiometric deformation is due to three different pointwise non-linear mappings applied to the intensities (amplitudes) of each of the channels of the template g. The mappings $Q_R$, $Q_G$ and $Q_B$, respectively corresponding to the RGB channels of the image, were chosen to be the following polynomials $$Q_R(t) = 2t - t^2; \quad Q_G(t) = 2t^2 - t^4; \quad Q_B(t) = t$$

The significant difference between the template and the observation images, both geometrically and radiometrically (color-wise), is easily noticeable. Therefore, featureless methods (area methods), which directly employ the intensity information of the images in order to establish an estimate of the geometric deformation will typically fail due to the (non-negligible) intensity mismatches. On the other hand, feature based methods, which are in a sense invariant to global mappings of intensities, will have "little to grasp on" in our example due to the "fractal" nature of the images. Feature based methods may also fail in more realistic scenarios (e.g., IR images), where the advantages of using a joint radiometric-geometric featureless method are clear, as emphasized by the example above.

Figure 3:
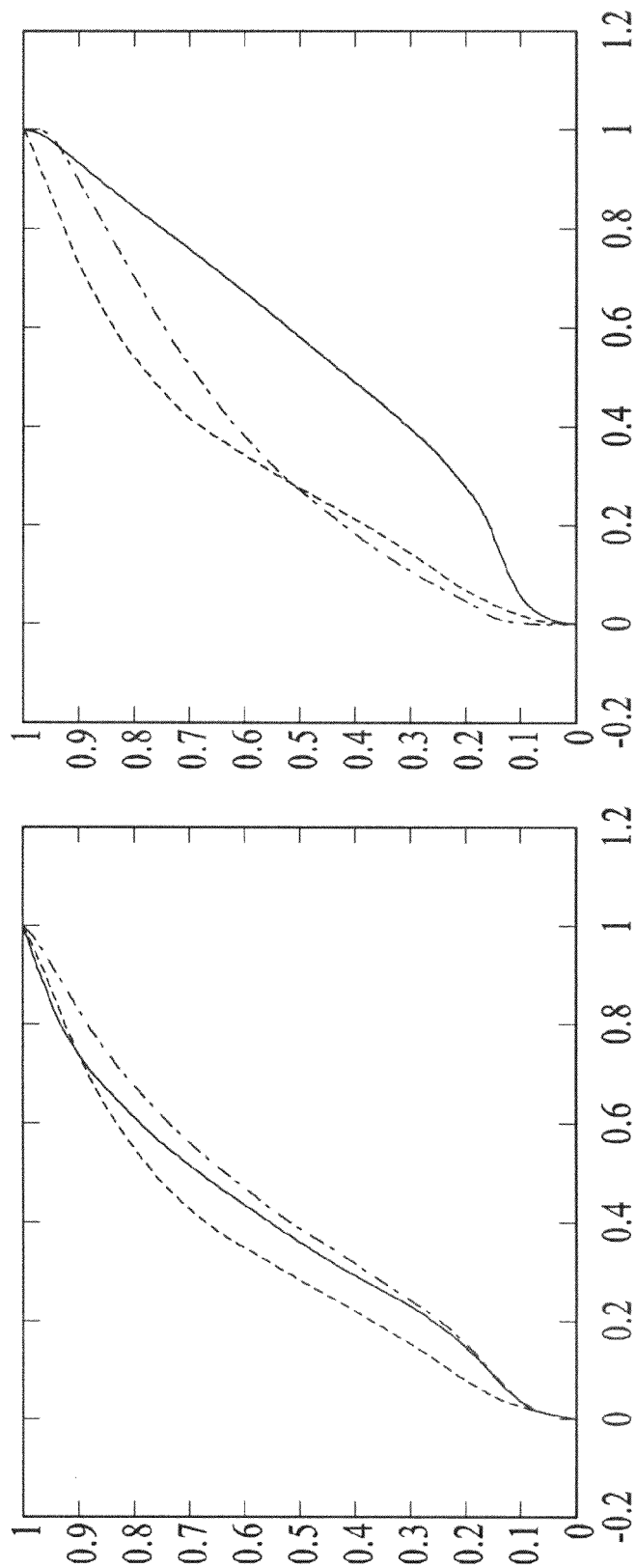
FIG. 3 shows the sample distributions of the template image, Tg (left) and of the observation image, Th (right).

Given only the two images g and h, we employed the radiometry-first estimation scheme derived in 1(b)(i). According to which, the first stage is estimating the non-linear radiometric deformations $Q_R$, $Q_G$ and $Q_B$. In order to do so, the sample distribution transformation T was applied to each of the channels of the images g and h (see 1(b)(i) for implementation remarks); the obtained distributions are shown in FIG. 3.

Figure 4:
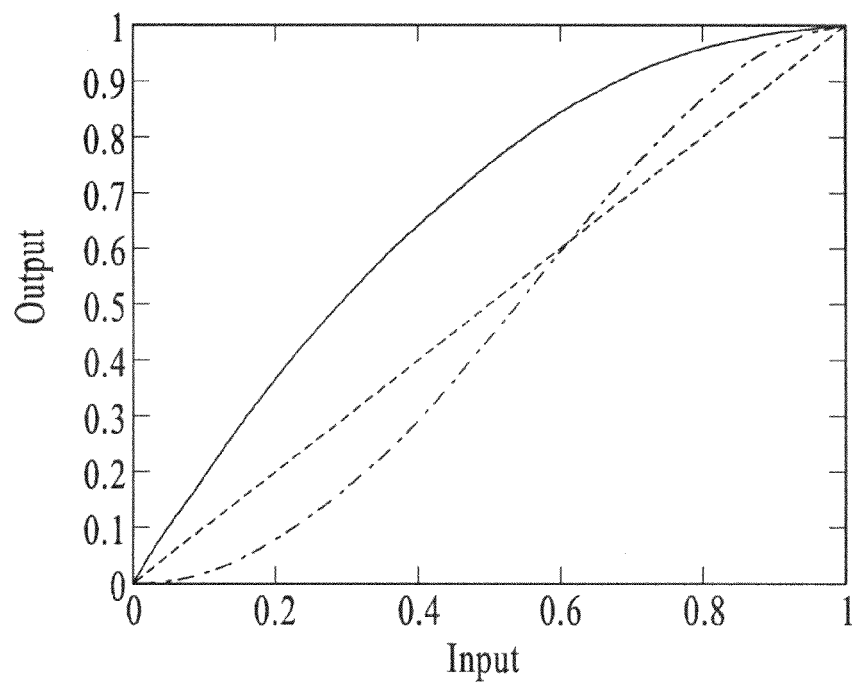
FIG. 4 illustrates the radiometric deformations $Q_R$, $Q_G$ and $Q_B$ of the three color channels (solid lines) and their estimates (dashed lines).

Corollary 2 now implies that the distributions of the template and observation are related by a deformation of coordinates, due to a right hand composition with $Q_R^{-1}$, $Q_G^{-1}$ and $Q_B^{-1}$, in each channel respectively. Thus, $Q_R$, $Q_G$ and $Q_B$ were individually estimated by applying the method proposed in 1(b)(i). The intensity mapping functions and their corresponding estimates, as obtained by the proposed algorithm, are shown in FIG. 4. The estimation errors are $2.67 \cdot 10^{-7}$; $9.02 \cdot 10^{-8}$ and $1.95 \cdot 10^{-7}$, respectively, (evaluated as the $L_2$ norm of the difference between the correct and estimated functions, normalized by the integration interval).

Figure 5:
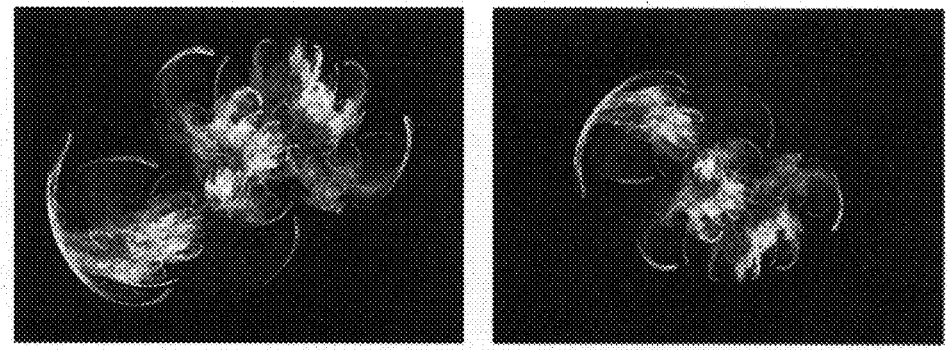
FIG. 5 shows radiometry estimation: radiometrically-registered template—the result of applying the estimated radiometric mappings $Q_R$, $Q_G$ and $Q_B$ to the template image g (left); the observation image h (right).

Next, the estimated radiometric mappings were applied to the template g to obtain a radiometrically-registered version of the template relative to the observation, as shown in FIG. 5. Noticeably, the images in FIG. 5 match radiometrically (color-wise), and differ only by geometry. As in (1.13), the problem has been reduced to a strictly geometric problem.

In order to estimate the affine transformation we employed the method outlined in 1(b)(ii) above. The estimate was obtained jointly for all channels by stacking the constraints (1.18) established for each individual channel into a single over-determined system. This system was solved for the elements of A and c using a least squares solution, which yielded the following estimate $$\hat{A} = \begin{bmatrix} 1.2970 & 0.2908 \\ 0.0980 & -1.3009 \end{bmatrix}; \quad \hat{c} = \begin{bmatrix} 0 \\ 0 \end{bmatrix}$$

The error in the estimation of A is $5.77 \cdot 10^{-5}$ (where we take the estimation error to be $\|I - A^{-1}\hat{A}\|_2^2$).

2. Estimation in the Presence of Noise

Recall the basic model $$h = Q \circ g \circ A + \eta, \quad (2.21)$$

where to simplify the notations we omit the argument of the functions. In the previous section we have only discussed that case where $\eta$ vanishes. In this section we discuss the noisy case, that is, where $\eta$ in (2.21) is a real-valued i.i.d. random field with a known distribution function $F_\eta$.

Remark 1. An important special case of (2.21) is the additive white Gaussian noise (AWGN) model, where $\eta$ is also assumed to be zero mean Gaussian with a known variance $\sigma_\eta^2$.

Previously, we have shown that the sample distribution transformation, T, plays a key role in enabling an elegant solution to the joint registration problem in the noiseless case. Therefore, it is natural to study the behavior of T in the case of noisy observations.

2(a) Introduction

Let us begin with an informal discussion. The easiest way to get some intuition as to the notion of the sample distribution in the case of noisy observations is to consider for a moment the discrete case, where histograms exist. Next, we intuitively answer the following question: How does the histogram of the sum of an image and a noise process look?

Each bin of the histogram represents the relative frequency of the respective level (value) in the image. Due to the additive noise, any image sample contributing to a single bin of the image histogram, say the n-th bin, will remain at the same level with some probability p(noise=0). Similarly an image pixel originally contributing to the n−1 bin, may with probability p(noise=1) contribute to the n-th bin of the noisy image histogram. Repeating the same argument for the entire support of the noise probability function, and summing-up all the contributions, we obtain the value of the n-th bin of the noisy image. Repeating the same argument for each bin of the image histogram implies that the histogram of the noisy observation is, qualitatively, the result of convolving the image histogram with the probability function of the noise.

More formally, suppose that h takes the additive model form $$h(x)=g(x)+\eta(x), x\in\text{supp}\{g\}, \quad (2.22)$$

where $g: R^m \to R$ is a known deterministic function and $\{\eta(x): x \in R^m\}$ is a real-valued i.i.d. random field with a known distribution function $F_\eta$. That is, for now, we disregard the left composition Q and the right composition A.

Random fields of the type (2.22) commonly represent noisy signals over a continuous domain, where one continuously measures some continuous physical quantity; the additive random component represents the overall measurement noise, usually due to the measurement procedure.

Fields of the type (2.22) are not identically distributed; moreover, their probability distribution function is location dependent, i.e., they are not, in any sense, stationary. However, one may still expect the sample distribution of h to hold information on both the deterministic and random components. Hence, the question of determining this sample distribution is an interesting problem on its own.

Intuitively, since h is the sum of two independent components, one may expect that by employing T, we can establish a law of large numbers to yield $Th=Tg*f_\eta$, where $f_\eta$ is the probability density function of $\eta$. However, the transformation T may not be directly applied to a field of the type (2.22), due to inherent measurability difficulties, to be soon discussed. That being the case, the following question must first be answered:

Can the "sample distribution" of a random field of the type (2.22) be defined, such that is has analogous properties to those introduced by the transformation T?

Of course the sample distribution of h may be defined in many ways. However, we pursue a definition that preserves the properties of T, elaborately discussed in 2(c), and lets us establish a sensible law of large numbers.

Considering similar problems in the case where the domain of the random field is discrete (i.e., where $x \in Z^m$) is elementary: the case of random processes of the type (2.22) with discrete-parameter (m=1) is straightforward and the case of multi-dimensional random fields with discrete-indices (m>1) reduces to the one-dimensional case upon selection of a total order on $Z^m$.

Nevertheless, there are scenarios where, due to the inherent structure of a problem, it is natural to discuss continuous-parameter multi-dimensional random fields (i.e., where $x \in R^m$). An example of such scenario is the problem of image registration we discuss. Inherently, the mapping A of $R^m$ into itself is of a continuous nature, as are the physical phenomena it represents in the various problems (e.g., time warping, geometric deformation, etc.). Thus, if we impose a discrete model (e.g., $x \in Z^m$), we find that, in general, the natural A to consider is incompatible (as for "almost all" $x \in Z^m$, $A(x) \notin Z^m$).

However, as explained below, considering the sample distribution or, in general, laws of large numbers in the case of continuous-parameter random fields with mutually independent random variables raises severe measurability difficulties. Such i.i.d.-driven random fields are not measurable in the usual sense, and thus, the notion of sample distribution, as introduced by T, is ill-posed and has to be properly redefined.

In J. L. Doob, *Stochastic processes*, Wiley Classics Library, John Wiley & Sons Inc., New York, 1990 (Reprint of the 1953 original), A Wiley-Interscience Publication (p. 78, 102), Doob mentioned that random processes with mutually independent random variables are too irregular to discuss in the continuous-parameter case. In a sense, sample paths of such processes are too erratic to be measurable. Indeed, in this case, the conditions of independence and joint measurability are incompatible with each other; in fact, the set of realizations whose corresponding sample-functions (sample-paths) are Lebesgue measurable is a non-measurable set; moreover, its inner and outer measures are zero and one, respectively. Furthermore, in K. L. Judd, The law of large numbers with a continuum of IID random variables, *J. Econom. Theory*, 35(1):19-25, 1985, Judd showed that, even if the sample-measurability problem is avoided (by a proper completion of the measure), laws of large numbers may not hold; the set of realizations where the laws of large numbers hold is again not measurable. Therefore, the Lebesgue measure offers no basis for a meaningful concept of the mean or the sample-distribution of a sample function.

Questions related to a continuum of independent and identically distributed random variables and corresponding laws of large numbers (e.g., sample-distribution) have evidently gained some interest, especially in economic theory, where various mass economic phenomena are modeled and studied. For example, in H. Uhlig, A law of large numbers for large economies, *Econom. Theory*, 8(1):41-50, 1996, a Riemann-like approach is invoked to integrate the sample function; then, laws of large numbers are obtained by using an $L_2$-norm convergence criterion. In another approach, large economies are modeled by hyperfinite processes which are measurable with respect to Loeb product spaces, and corresponding laws of large numbers are derived.

In the first three parts of this section 2 we present an approach in which the desired continuous structure of the deterministic component g is maintained while avoiding the measurability difficulties attributed to the random component $\eta$. In Part 2(c), we redefine the sample distribution transformation by "uniformly sampling" the random field h. This transformation establishes a strong law of large numbers (in the stochastic case) and reduces to T in the deterministic case. The conditions on which this transformation may be a applied to a random field of the additive model type (2.22) are discussed.

In 2(d) we determine the sample distribution of the random field h, in terms of the sample distribution of the deterministic component g and of the probability distribution of the random field $\eta$. Not surprisingly, the result we obtain resembles the known fact that the probability distribution of the sum of two independent random variables is the convolution of their distributions.

Finally, in 2(e) we apply the results to derive a solution to the foregoing registration problem in the case where the observation is subject to an additive noise. Similarly to the noiseless case, estimation of both geometric and radiometric deformation is accomplished by of solving linear systems of equations.

2(b) Distribution Transformation of a Deterministic Function

We begin by defining the three basic transformations we shall discuss.

Let $\{u_i\}_{i=1}^\infty \subset R^m$ be a given sequence of points in $R^m$. For any function $\bar{h}: R^m \to R$ let us define the family of transformations $\{T_n^{\{u_i\}}\}_{n=1}^\infty$ by $$[T_n^{\{u_i\}}h](t) = \frac{1}{n}\#\{i = 1, \ldots, n : h(u_i) \le t\}, \quad (2.23)$$

where #A denotes the cardinality of the set A. Furthermore, whenever the limit $$\lim_{n\to\infty} [T_n^{\{u_i\}}h](t)$$

exists for all t∈R, we define $T^{\{u_i\}}$ by $$T^{\{u_i\}}h = \lim_{n\to\infty} T_n^{\{u_i\}h}. \quad (2.24)$$

Recall that the transformation T on $B_c(R^m)$ has already been defined as $$[Th](t) = \frac{\lambda\{x \in supp\{h\} : h(x) \le t\}}{\lambda\{supp\{h\}\}}, \quad h \in B_c(R^m). \quad (2.25)$$

Notice that it also admits the following equivalent integral form $$[Th](t) = \frac{1}{\lambda\{supp\{h\}\}}\int_{supp\{h\}}[\chi_{(-\infty,t]}\circ h](x)d\lambda(x), \quad (2.26)$$

where $\chi_A$ denotes the indicator function of the set A and ∘ denotes the composition of functions.

Remark 2. While the transformation $T_n^{\{u_i\}}$ is well defined for any real function, the transformation $T^{\{u_i\}}$ is not necessarily defined for any selection of a sequence $\{u_i\}_{i=1}^\infty$.

2(b)(i) Uniformly Distributed Sequences

To proceed, we introduce some basic definitions and results from the theory of uniform distribution of sequences (also known as equidistribution of sequences). For a=$(a_1, \ldots, a_m)$ and b=$(b_1, \ldots, b_m)$ in $R^m$, we say that a≦b if $a_j \le b_j$ for all j=1, ..., m. Define the m-dimensional rectangle [a,b] as the set $\{x : a \le x \le b\}$. Using the notations 0=(0, ..., 0) and 1=(1, ..., 1), the rectangle [0,1] is the m-dimensional unit cube.

Definition 1. The sequence $\{u_i\}_{i=1}^\infty \subset [0,1]$ is uniformly distributed in [0,1] with respect to the Lebesgue measure λ (abbreviated λ-u.d.) if $$\lim_{n\to\infty}\frac{1}{n}\#\{i = 1, \ldots, n : u_i \in [a,b]\} = \lambda[a,b] = \prod_{i=1}^n(b_i - a_i)$$

for all [a,b]⊂[0,1].

That is, in simple terms, the proportion of terms falling in any sub-rectangle is proportional to its volume.

Remark 3. Many constructive examples of λ-u.d. sequences in [0,1]⊂R exist. In fact, u.d. sequences are natural in the sense that a sequence of realizations of a uniformly distributed random variable is almost surely a lambda-u.d. sequence (an immediate result of the strong law of large numbers). A generalization of the construction of u.d. sequences to [0,1]⊂$R^m$ is straightforward.

The following characterization of λ-u.d. sequences is given in L. Kuipers and H. Niederreiter, *Uniform distribution of sequences*, Wiley-Interscience [John Wiley & Sons], New York, 1974, a sequence $\{u_i\}_{i=1}^\infty$ is λ-u.d. in [0,1] if and only if for every Riemann integrable function h on [0,1]

$$\lim_{n\to\infty}\frac{1}{n}\sum_{i=1}^n h(u_i) = \int_{[0,1]}h(x)d\lambda(x).$$

Remark 4. This characterization cannot be generalized to Lebesgue measurable functions since, in general, the Lebesgue integral cannot be determined by the values of a function on any countable set of points.

We would like to expand the notion of λ-u.d. sequences to non-rectangular subsets of $R^m$. In order to do so, let us briefly introduce the Jordan measure through the following characterization. Let A⊂$R^m$ be a bounded set; the following are equivalent:

1. A is Jordan measurable.
2. $\chi^A$, the indicator function of A, is Riemann integrable.
3. $\lambda\{\partial A\}=0$, that is, the boundary of A is of Lebesgue measure zero.

Whenever a set is Jordan measurable, its Jordan measure (also called Jordan content) is exactly its Lebesgue measure. It should be noted that the Jordan measure is a weak notion of measure, since it is simply the restriction of the Lebesgue measure to the ring of bounded Lebesgue measurable sets having boundary of measure zero. Nevertheless, the Riemann integral can be defined in terms of Jordan measure in about the same way that the Lebesgue integral is defined in terms of Lebesgue measure. Therefore, since λ-u.d. sequences are characterized in terms of Riemann integrable functions, the natural non-rectangular subsets of $R^m$ to consider in this context are Jordan measurable sets.

Throughout, whenever we let U⊂$R^m$ be a compact, Jordan measurable subset of $R^m$, we also assume it is of a positive measure.

Definition 2. Let U⊂$R^m$ be a compact, Jordan measurable subset of $R^m$. A sequence $\{u_i\}_{i=1}^\infty \subset U$ is λ-u.d. in U if $$\lim_{n\to\infty}\frac{1}{n}\sum_{i=1}^n h(u_i) = \frac{1}{\lambda\{U\}}\int_U h(x)d\lambda(x)$$

for every Riemann integrable function h with supp$\{h\}$⊂U.

Remark 5. By using Definition 2, it is easy to see that the λ-u.d. property of a sequence is preserved under non-singular affine transformations: let A be a non-singular affine transformation of $R^m$; $\{u_i\}_{i=1}^\infty$ is λ-u.d. in U if and only if $\{A(u_i)\}_{i=1}^\infty$ is λ-u.d. in A(U).

Indeed, suppose $\{A(u_i)\}_{i=1}^\infty$ is λ-u.d. in A(U). Let h be a Riemann integrable function with supp$\{h\}$⊂U. Obviously, (h∘$A^{-1}$) is a Riemann integrable function whose support is contained in A(U). By applying the λ-u.d. property of $\{A(u_i)\}_{i=1}^\infty$ and substituting y=$A^{-1}(x)$, we find that $$\lim_{n\to\infty}\frac{1}{n}\sum_{i=1}^n h(u_i) = \lim_{n\to\infty}\frac{1}{n}\sum_{i=1}^n h(A^{-1}(A(u_i)))$$

$$= \frac{1}{\lambda\{A(U)\}}\int_{A(U)}h(A^{-1}(x))d\lambda(x)$$

$$= \frac{1}{|A|\lambda\{U\}} \int_U h(y)|A|d\lambda(y) = \frac{1}{\lambda\{U\}} \int_U h(y)d\lambda(y),$$

and therefore $\{u_i\}_{i=1}^\infty$ is λ-u.d. in U.

To complete the definition of λ-u.d. sequences in non-rectangular subsets of $R^m$, we must validate that such sequences exist, as the next lemma asserts.

Lemma 1. Let $U \subset R^m$ be a compact, Jordan measurable subset of $R^m$. There exists a λ-u.d. sequence $\{u_i\}_{i=1}^\infty$ in U.

Proof. Without loss of generality we assume that $U \subset [0,1]$; otherwise, choose A to be a non-singular affine transformation of $R^m$ such that $A(U) \subset [0,1]$ and use Remark 5.

Let $\{u_i\}_{i=1}^\infty$ be a λ-u.d. sequence in [0,1]. Define the subsequence $\{i_k\}_{k=1}^\infty$ recursively: $i_1 = \min\{i \geq 1 : u_i \in U\}$ and $i_k = \min\{i > i_{k-1} : u_i \in U\}$, $k \geq 2$. That is, $\{i_k\}_{k=1}^\infty$ is the maximal strictly increasing subsequence such that $u_{i_k} \in U$ for all k. Notice that since U is of positive measure, $i_k$ is finite for every k, and thus, $\{i_k\}_{k=1}^\infty$ is well defined. We will prove that the subsequence $\{u_{i_k}\}_{k=1}^\infty$ is λ-u.d. in U.

Let h be a Riemann integrable function with supp{h} $\subset$ U. Since supp{h} $\subset$ U, we have $h(u_i)=0$ for $i \notin \{i_k\}_{k=1}^\infty$, hence $$\frac{1}{n}\sum_{k=1}^n h(u_{i_k}) = \frac{1}{n}\sum_{i=1}^{i_n} h(u_i) = \frac{i_n}{n} \cdot \frac{1}{i_n}\sum_{i=1}^{i_n} h(u_i) \quad (2.27)$$

for all n. By the construction of $\{i_k\}_{k=1}^\infty$, exactly n of the first $i_n$ elements of $\{u_i\}_{k=1}^\infty$ belong to U. Hence, with $\chi_U$ denoting the characteristic function of U, for all n we have $$n = \sum_{i=1}^{i_n} \chi_U(u_i).$$

Notice that $n \leq i_n$ and thus $n \to \infty$ implies $i_n \to \infty$. Since U is Jordan measurable, the function $\chi_U$ is Riemann integrable so that we can use the λ-u.d. property of $\{u_i\}_{i=1}^\infty$ in [0,1] to obtain $$\lim_{n \to \infty} \frac{n}{i_n} = \lim_{n \to \infty} \frac{1}{i_n}\sum_{i=1}^{i_n} \chi_U(u_i) = \int_{[0,1]} \chi_U(x)d\lambda(x) = \lambda\{U\}.$$

Using the same property of $\{u_i\}_{i=1}^\infty$ again, we obtain $$\lim_{n \to \infty} \frac{1}{i_n}\sum_{i=1}^{i_n} h(u_i) = \int_{[0,1]} h(x)d\lambda(x) = \int_U h(x)d\lambda(x).$$

Substituting into (2.27) yields $$\lim_{n \to \infty} \frac{1}{n}\sum_{k=1}^n h(u_{i_k}) = \lim_{n \to \infty} \frac{i_n}{n} \cdot \frac{1}{i_n}\sum_{i=1}^{i_n} h(u_i) = \frac{1}{\lambda\{U\}}\int_U h(x)d\lambda(x). \quad (2.28)$$

Since (2.28) holds for any Riemann integrable function h with supp{h} $\subset$ U, the sequence $\{u_{i_k}\}_{k=1}^\infty$ is λ-u.d. in U.

2(b)(ii) $\overline{\text{On}}$ the Transformation $T^{\{u_i\}}$

Next, we elaborate on the relationship between the transformation T and the transformation $T^{\{u_i\}}$, defined in (2.24). In order to do so, we restrict the discussion to a better behaved class of functions.

Given a function h, define $L_h(t) = \{x \in \text{supp}\{h\} : h(x) \leq t\}$. Denote $R_c(R^m) = \{h \in B_c(R^m) : h \text{ is Riemann integrable and } L_h(t)$ is Jordan measurable for all $t\}$.

That is, $R_c(R^m)$ is the subset of $B_c(R^m)$ of Riemann integrable functions that also have Jordan measurable sub-level sets, restricted to its support.

It should be noted that the additional requirement that $L_h(t)$ is Jordan measurable for all t is not very strong. In [22] it is shown that given a Riemann integrable function h, for all except at most a countable number values of t, the subsets $L_h(t)$ are Jordan measurable. That, in turn, implies that if $L_h(t_0)$ is not Jordan measurable for some $t_0$ then, for arbitrarily small $\epsilon > 0$, the set $\{x \in \text{supp}\{h\} : t_0 - \epsilon < h(x) \leq t_0\}$ has a boundary of a positive measure. Hence, Riemann integrable functions that do not comply with the above requirement are, roughly speaking, irregular.

Moreover, from an applied point of view, restricting the discussion to $R_c(R^m)$ imposes no significant practical limitations being "rich" enough to describe any sampled physical signal.

Lemma 2. Let $U \subset R^m$ be a compact, Jordan measurable subset of $R^m$ and $\{u_i\}_{i=1}^\infty$ be a λ-u.d. sequence in U. For all $h \in R_c(R^m)$ with supp{h} = U we have $$Th = T^{\{u_i\}}h. \quad (2.29)$$

If, in addition, h assumes only finitely many values, then for all t we have $$\frac{\lambda\{x \in U : h(x) = t\}}{\lambda\{U\}} = \lim_{n \to \infty} \frac{1}{n}\#\{i = 1, \ldots, n : h(u_i) = t\}. \quad (2.30)$$

Proof. Since $h \in R_c(R^m)$, the set $L_h(t)$ is Jordan measurable for all t. Equivalently, the function $\chi_{(-\infty,t]} \circ h$ is Riemann integrable on U for all t, as $\chi_{(-\infty,t]} \circ h = \chi_{L_h(t)}$ on U. Therefore, the bda-u.d. property of the sequence $\{u_i\}_{i=1}^\infty$ may be applied to obtain $$[Th](t) = \frac{1}{\lambda\{U\}}\int_U [\chi_{(-\infty,t]} \circ h](x)d\lambda(x) =$$

$$\lim_{n \to \infty}\frac{1}{n}\sum_{i=1}^n [\chi_{(-\infty,t]} \circ h](u_i) = \lim_{n \to \infty}\frac{1}{n}\#\{i = 1, \ldots, n : h(u_i) \leq t\} = [T^{\{u_i\}}h](t).$$

Hence, the first part of the claim is proved. Denote by $\{v_1 < v_2 < \ldots < v_R\}$ the values h assumes under the finite range assumption. Obviously, (2.30) holds for $t \notin \{v_1, v_2, \ldots, v_R\}$. Using (2.29), for $t = v_r$, $r = 1, \ldots, R$, we find that $$\frac{\lambda\{x \in U : h(x) = v_r\}}{\lambda\{U\}} = [Th](v_r) - [Th]\left(\frac{v_r + v_{r-1}}{2}\right) =$$

$$[T^{\{u_i\}}h](v_r) - [T^{\{u_i\}}h]\left(\frac{v_r + v_{r-1}}{2}\right) = \lim_{n \to \infty}\frac{1}{n}\#\{i = 1, \ldots, n : h(u_i) = v_r\},$$

where $v_0$ is arbitrarily set to be less than $v_1$, which completes the proof.

Thus, for a proper selection of $\{u_i\}_{i=1}^{\infty}$, the transformation T can be calculated by means of $\{T_n^{\{u_i\}}\}_{n=1}^{\infty}$ on the well-behaved class of functions $R_c(R^m)$.

We conclude this section with the following simple lemmas:

Lemma 3. If $h, \bar{h} \in B_c(R^m)$ such that $\underline{h} \leq \bar{h}$ then $T_n^{\{u_i\}} \bar{h} \leq T_n^{\{u_i\}} h$ for all $n \in N$.

Proof. Simply follows by noticing that $\{x:\bar{h}(x) \leq t\} \subseteq \{x: h(x) \leq t\}$.

Lemma 4. If $Q:R \to R$ is a continuous strictly increasing function such that $Q(0)=0$ and $A:R^m \to R^m$ is a non-singular affine transformation, then $$Q \circ g \circ A \in R_c(R^m), \text{ for all } g \in R_c(R^m).$$

Proof. Let $g \in R_c(R^m)$. Since A is non-singular affine, $g \circ A$ is bounded and compactly supported. As g is Riemann integrable, its set of discontinuities has measure zero. Since $\{x:g \circ A \text{ is continuous at } x\} = A^{-1}(\{x:g \text{ is continuous at } x\})$, and thus $g \circ A$ we conclude that the set of discontinuities of $g \circ A$ is of measure zero as well. Therefore, $g \circ A$ is Riemann integrable. The set $L_{g \circ A}(t) = A^{-1}(L_g(t))$ is Jordan measurable for all $t \in R$, from which we conclude that $g \circ A \in R_c(R^m)$.

On the other hand, Q is a continuous strictly increasing on R and thus $Q \circ g$ is bounded. $Q \circ g$ is compactly supported since $Q(0)=0$. Since Q is continuous, we have that $\{x:Q \circ g \text{ is continuous at } x\} = \{x:g \text{ is continuous at } x\}$ and thus, as g is Riemann integrable, so is $Q \circ g$. Finally, $L_{Q \circ g}(t) = L_g(Q^{-1}(t))$, and thus $Q \circ g \in R_c(R^m)$.

2(c) Distribution Transformations of Random Fields

So far, we have discussed the properties of a family of distribution transformations when applied to deterministic functions. We shall now discuss the results of applying the transformations $T_n^{\{u_i\}}$ and $T^{\{u_i\}}$ to a random field.

Let $\{\eta(x):x \in R^m\}$ be a real-valued i.i.d. random field on $(\Omega, F, P)$ with a known probability distribution function $F_\eta$. Let $\{u_i\}_{i=1}^{\infty}$ be a given sequence of distinct points in $R^m$. The transformation $T_n^{\{u_i\}}$ can now be applied to $\eta$. Put:

$$F^{(n)}(t) = [T_n^{\{u_i\}} \eta](t) = \frac{1}{n}\#\{i = 1, \ldots, n : \eta(u_i) \leq t\}.$$

$F^{(n)}$ is known as the empirical distribution function of $\{\eta(u_i)\}_{i=1}^{n}$. For fixed t, $F^{(n)}(t)$ is a random variable (of the implicit variable $\omega$). For a realization of the random field (i.e., fixed $\omega$) the function $F^{(n)}(t)$ is a distribution function as it is an increasing step function jumping by $1/n$ at each point $\eta(u_i)$.

In this context, the Glivenko-Cantelli theorem can be rephrased to state that:

$$\lim_{n \to \infty} F^{(n)}(t) = F_\eta(t) \text{ a.s.},$$

uniformly in t, that is, $$\lim_{n \to \infty} \|F^{(n)} - F_\eta\|_\infty = 0$$

with probability 1. Therefore, in terms of the transformations we have previously defined, $T^{\{u_i\}}\eta = \lim_{n \to \infty} T_n^{\{u_i\}}\eta = F_\eta$ with probability 1. Hence, for any sequence of distinct points $\{u_i\}_{i=1}^{\infty} \subset R^m$ the transformation $T^{\{u_i\}}$ is a strongly consistent non-parametric estimator for the probability distribution function of the random field $\{\eta(x):x \in R^m\}$.

We conclude this section with the following lemma:

Lemma 5. Let S be an infinite subset of $\{u_i:i=1,2,\ldots\}$. Then $$\lim_{n \to \infty} \frac{\#\{i = 1, \ldots, n: u_i \in S \text{ and } \eta(u_i) \leq t\}}{\#\{i = 1, \ldots, n: u_i \in S\}} = F_\eta(t)$$

a.s., uniformly in t.

Proof. Let $$F_n^S(t) = \frac{\#\{i = 1, \ldots, n: u_i \in S \text{ and } \eta(u_i) \leq t\}}{\#\{i = 1, \ldots, n: u_i \in S\}}$$

Given the subset S, let $\{i_k\}_{k=1}^{\infty}$ be a strictly increasing subsequence of indices such that $S = \{u_{i_k}\}_{k=1}^{\infty}$. We then have $$F_{i_k}^S(t) = \frac{\#\{i = 1, \ldots, i_k: u_i \in S \text{ and } \eta(u_i) \leq t\}}{\#\{i = 1, \ldots, i_k: u_i \in S\}}$$

$$= \frac{\#\{j = 1, \ldots, k: \eta(u_{i_j}) \leq t\}}{k}.$$

Now, by the Glivenko-Cantelli theorem we conclude that $\lim_{k \to \infty} F_{i_k}^S(t) = F_\eta(t)$ a.s., uniformly in t. In particular, $\{F_n^S(t)\}_{n=1}^{\infty}$ has a convergent subsequence. Furthermore, since $\{i_k\}$ is strictly increasing, $u_{i_k+1}, u_{i_k+2}, \ldots, u_{i_{k+1}-1} \notin S$. Thus, $F_n^S(t)$ is constant for $n = i_k, i_k+1, \ldots, i_{k+1}-1$, that is, $F_n^S(t) = F_{i_k}^S(t)$ for $i_k \leq n < i_{k+1}$. Since $$|F_n^S(t) - F_\eta(t)| \leq |F_n^S(t) - F_{i_k}^S(t)| + |F_{i_k}^S(t) - F_\eta(t)|$$

the choice $i_k \leq n < i_{k+1}$ eliminates $|F_n^S(t) - F_{i_k}^S(t)|$, hence we have $$\lim_{n \to \infty} F_n^S(t) = \lim_{k \to \infty} F_{i_k}^S(t) = F_\eta(t)$$

a.s., uniformly in t.

2(d) Distribution Transformation of the Additive Model

In this section, we return to discuss the additive model. Suppose that h takes the form $$h(x) = g(x) + \eta(x), x \in \text{supp}\{g\}, \quad (2.31)$$

where $g \in R_c(R^m)$ is a deterministic function and $\{\eta(x): x \in R^m\}$ is a real-valued i.i.d. random field with distribution function $F_\eta$.

Let $U = \text{supp}\{g\}$ and $\{u_i\}_{i=1}^{\infty}$ be a $\lambda$-u.d. sequence of distinct points in U (such exist, according to Lemma 1).

Proposition 6. If g assumes only finitely many values $\{v_1, \ldots, v_R\}$, then $$[T^{\{u_i\}} h](t) = \sum_{r=1}^{R} \frac{\lambda\{x \in U: g(x) = v_r\}}{\lambda\{U\}} F_\eta(t - v_r) \text{ a.s.}$$

Proof. By the definition of $T_n^{\{u_i\}}$ $$[T_n^{\{u_i\}} h](t) = \frac{1}{n}\#\{i = 1, \ldots, n: g(u_i) + \eta(u_i) \leq t\} \quad (2.32)$$

for all n and all t. Since g assumes finitely many values, the right-hand side of (2.32) decomposes into a finite sum:

$$\frac{1}{n}\#\{i=1,\ldots,n:g(u_i)+\eta(u_i)\le t\}= \quad (2.33)$$
$$\sum_{r=1}^{R}\frac{1}{n}\#\left\{i=1,\ldots,n:g(u_i)=v_r \text{ and } \eta(u_i)\le t-v_r\right\}.$$

Without loss of generality, we may assume there exists an $n_0$ such that the sets $\{i=1,\ldots,n_0:g(u_t)=v_r\}$ are non-empty for $r=1,\ldots,R$; otherwise, the empty terms in (2.33) may be excluded. Hence, for $n \ge n_0$, each term of the sum on the right-hand side of (2.33) may be written as a product of two factors $$\frac{1}{n}\#\{i=1,\ldots,n:g(u_i)=v_r \text{ and } \eta(u_i)\le t-v_r\}=D_n^{(r)}\cdot F_n^{(r)}(t-v_r),$$

where we denote $$D_n^{(r)}=\frac{\#\{i=1,\ldots,n:g(u_i)=v_r\}}{n}$$
$$F_n^{(r)}(t)=\frac{\#\{i=1,\ldots,n:g(u_i)=v_r \text{ and } \eta(u_i)\le t\}}{\#\{i=1,\ldots,n:g(u_i)=v_r\}}.$$

Notice that $\{D_n^{(r)}\}_{n=1}^{\infty}$ is a deterministic sequence, while $\{F_n^{(r)}(\bullet)\}_{n=1}^{\infty}$ is a sequence of random processes. With these notations, $$[T_n^{\{u_i\}}h](t)=\sum_{r=1}^{R}D_n^{(r)}\cdot F_n^{(r)}(t-v_r)$$

Now, since the conditions of Lemma 2 are satisfied, $$\lim_{n\to\infty}D_n^{(r)}=\lim_{n\to\infty}\frac{\#\{i=1,\ldots,n:g(u_i)=v_r\}}{n}=\frac{\lambda\{x\in U:g(x)=v_r\}}{\lambda\{U\}}$$

for $r=1,\ldots,R$. Denote the limit $D^{(r)}=\lim_{n\to\infty}D_n^{(r)}$. Further notice that since the discrete-parameter random process $\{\eta(u_i):i=1,2,\ldots\}$ satisfies the conditions of the Glivenko-Cantelli theorem, Lemma 5 may be used to obtain $$\lim_{n\to\infty}F_n^{(r)}(t)=F_\eta(t) \quad \text{a.s.}$$

uniformly in t. Finally, since with probability 1 we have $$\|D_n^{(r)}F_n^{(r)}-D^{(r)}F_\eta\|_\infty = \|D_n^{(r)}F_n^{(r)}-D^{(r)}F_n^{(r)}+D^{(r)}F_n^{(r)}-D^{(r)}F_\eta\|_\infty \le |D_n^{(r)}-D^{(r)}|\|F_n^{(r)}\|_\infty + D^{(r)}\|F_n^{(r)}-F_\eta\|_\infty,$$

the limit $\lim_{n\to\infty}\{D_n^{(r)}\cdot F_n^{(r)}(t-v_r)\}$ exists almost surely for all r, and we find that $$[T^{\{u_i\}}h](t)=\lim_{n\to\infty}[T_n^{\{u_i\}}h](t)=\sum_{r=1}^{R}\lim_{n\to\infty}\{D_n^{(r)}\cdot F_n^{(r)}(t-v_r)\}= \quad (2.34)$$
$$\sum_{r=1}^{R}\frac{\lambda\{x\in U:g(x)=v_r\}}{\lambda\{U\}}F_\eta(t-v_r) \quad \text{a.s.}$$

which concludes the proof.

In the special case, where the random field $\{\eta(x):x\in R^m\}$ has an absolutely continuous probability distribution, we have the following result:

Theorem 7. Let $f_\eta$ be the probability density function of the random field $\{\eta(x):x\in R^m\}$. Then, the limit $$\lim_{n\to\infty}T_n^{\{u_i\}}h$$

exists, and $$T^{\{u_i\}}h=[T^{\{u_i\}}g]*f_\eta \quad \text{a.s.}$$

Furthermore, this equality also holds in $L_p(\Omega,P)$-norm, $1\le p<\infty$.

Proof. We split the proof into two steps. First, we prove the assertion for $g\in R_c(R^m)$ that only assumes finitely many values. We then extend the result to an arbitrary $g\in R_c(R^m)$. We shall use the same notations as in the proof of Lemma 2.6.

Notice that $F_\eta$ can be represented as the convolution of $f_\eta$ with the unit step function $\chi_{[0,\infty)}$, $$F_\eta(t)=\int_{-\infty}^{t}f_\eta(\tau)d\tau=\int_{-\infty}^{\infty}f_\eta(\tau)\chi_{[0,\infty)}(t-\tau)d\tau$$

for all $t\in R$. Substituting into (2.34) yields $$[T^{\{u_i\}}h](t)=\sum_{r=1}^{R}\frac{\lambda\{x\in U:g(x)=v_r\}}{\lambda\{U\}}\int_{-\infty}^{\infty}f_\eta(\tau)\chi_{[0,\infty)}(t-v_r-\tau)d\tau \quad (2.35)$$

with probability 1. Since $\chi_{[0,\infty)}(t-v_r-\tau)=\chi_{[v_r,\infty)}(t-\tau)$, we have $$[T^{\{u_i\}}h](t)=\int_{-\infty}^{\infty}f_\eta(\tau)\left[\sum_{r=1}^{R}\frac{\lambda\{x\in U:g(x)=v_r\}}{\lambda\{U\}}\chi_{[v_r,\infty)}\right](t-\tau)d\tau. \quad (2.36)$$

Clearly, $$\left[\sum_{r=1}^{R}\frac{\lambda\{x\in U:g(x)=v_r\}}{\lambda\{U\}}\chi_{[v_r,\infty)}\right](t)= \quad (2.37)$$
$$\sum_{\{v_r\le t\}}\frac{\lambda\{x\in U:g(x)=v_r\}}{\lambda\{U\}}=\frac{\lambda\{x\in U:g(x)\le t\}}{\lambda\{U\}}=[Tg](t).$$

Substituting (2.37) into (2.36), we obtain $$[T^{\{u_i\}}h](t) = \int_{-\infty}^{\infty} f_\eta(\tau)[Tg](t-\tau)d\tau = [[Tg] * f_\eta](t) \text{ a.s.} \quad (2.38)$$

Finally, since $\{u_i\}_{j=1}^{\infty}$ is a $\lambda$-u.d. sequence in U, Lemma 2 implies that $Tg=T^{\{u_i\}}g$, and therefore $$[T^{\{u_i\}}h](t) = ([T^{\{u_i\}}g] * f_\eta)(t) \text{ a.s.} \quad (2.39)$$

Thus, the assertion is proved, given that $g \in R_c(R_m)$ is also a simple function, that is, g only assumes finitely many values.

Next, we extend this result to an arbitrary $g \in R_c(R^m)$ by means of approximation from below and from above.

Let $\bar{g}_k = \lceil kg \rceil / k$, $k \geq 1$. It is easy to see that $\{\bar{g}_k\}$ is a sequence of simple functions in $R_c(R^m)$ such that $\bar{g}_k \geq g$ and $\bar{g}_k \to g$ pointwise. Importantly, this also implies that $$(\chi_{(-\infty,t]} \circ \bar{g}_k) \to (\chi_{(-\infty,t]} \circ g) \quad (2.40)$$

pointwise, for all t. This important property is simply due to the left continuity of $\chi_{(-\infty,t]}$ and the fact that $\bar{g}_k \geq g$.

Similarly, let $\underline{\tilde{g}}_k = \lfloor kg \rfloor / k$, $k \geq 1$. Then, $\{\underline{\tilde{g}}_k\}$ is a sequence of simple functions in $R_c(R^m)$ such that $g \geq \underline{\tilde{g}}_k$ and $\underline{\tilde{g}}_k \to g$ pointwise. In this case, however, a property similar to (2.40) is not guaranteed. Namely, fix $t \in R$, $x \in R^m$, and examine $[\chi_{(-\infty,t]} \circ \underline{\tilde{g}}_k](x)$ as $k \to \infty$; three possible cases arise: (i) if $g(x) > t$ then $[\chi_{(-\infty,t]} \circ \underline{\tilde{g}}_k](x) = [\chi_{(-\infty,t]} \circ g](x) = 0$ for all k; (ii) if $g(x) < t$ then there exists some $k_0 \in N$ such that $[\chi_{(-\infty,t]} \circ \underline{\tilde{g}}_k](x) = [\chi_{(-\infty,t]} \circ g](x) = 1$ for all $k > k_0$; (iii) if $g(x) = t$ then $[\chi_{(-\infty,t]} \circ \underline{\tilde{g}}_k](x) \leq [\chi_{(-\infty,t]} \circ g](x) = 1$ for all k. Hence, a problem may occur for values of t such that $\{x:g(x)=t\}$ has a positive measure. This problem, however, is simple to rectify since $\{x:g(x)=t\}$ has zero measure for all except at most a countable number values of t. Let $\{t_k\}$ be the values of t for which $\{x:g(x)=t\}$ has a positive measure, and define $$\underline{g}_k(x) = \begin{cases} g(x), & g(x) = t_j, j = 1, \ldots, k \\ \underline{\tilde{g}}_k(x), & \text{otherwise.} \end{cases}$$

Clearly, $\{\underline{g}_k\}$ is a sequence of simple functions in $R_c(R^m)$ such that $g \geq \underline{g}_k$ and $\underline{g}_k \to g$ pointwise. Moreover, $$(\chi_{(-\infty,t]} \circ \underline{g}_k) \to (\chi_{(-\infty,t]} \circ g) \text{ a.e.} \quad (2.41)$$

for all t.

Recall that $h = g + \eta$, and similarly denote $$\underline{h}_k = \underline{g}_k + \eta, \quad \bar{h}_k = \bar{g}_k + \eta.$$

Since $\underline{g}_k$ and $\bar{g}_k$ assume only finitely many values, (2.39) implies that there exist subsets $\underline{\Omega}_0^{(k)}, \bar{\Omega}_0^{(k)} \subset \Omega$, $k=1,2,\ldots$, of measure one such that $$T^{\{u_i\}}\underline{h}_k = [T^{\{u_i\}}\underline{g}_k] * f_\eta, \text{ on } \underline{\Omega}_0^{(k)} \quad (2.42)$$

and $$T^{\{u_i\}}\bar{h}_k = [T^{\{u_i\}}\bar{g}_k] * f_\eta, \text{ on } \bar{\Omega}_0^{(k)}. \quad (2.43)$$

Denote $$\Omega_0 = \bigcap_k (\underline{\Omega}_0^{(k)} \cap \bar{\Omega}_0^{(k)}).$$

so that, $\Omega_0$ is again of measure one, being a countable intersection of sets of measure one. Now, fix $\omega \in \Omega_0$ (i.e., fix a realization of $\eta$). Since $\bar{g}_k \geq g \geq \underline{g}_k$, we also have $\bar{h}_k \geq h \geq \underline{h}_k$. According to Lemma 3, for all $n \in N$ we have $$T_n^{\{u_i\}}\underline{h}_k \leq T_n^{\{u_i\}}h \leq T_n^{\{u_i\}}\bar{h}_k.$$

Taking $n \to \infty$ gives, for every k, $$T^{\{u_i\}}\underline{h}_k = \quad (2.44)$$
$$\lim_{n \to \infty} T_n^{\{u_i\}}\underline{h}_k \leq \liminf_{n \to \infty} T_n^{\{u_i\}}h \leq \limsup_{n \to \infty} T_n^{\{u_i\}}h \leq \lim_{n \to \infty} T_n^{\{u_i\}}\bar{h}_k = T^{\{u_i\}}\bar{h}_k.$$

We shall show that $T^{\{u_i\}}\underline{h}_k$ and $T^{\{u_i\}}\bar{h}_k$ tend to the same limit as $k \to \infty$.

Notice that, by using Lemma 2 and the integral form of T, we have $$[T^{\{u_i\}}g](t) = [Tg](t) = \frac{1}{\lambda\{U\}} \int_U [\chi_{(-\infty,t]} \circ g](x)d\lambda(x)$$

and $$[T^{\{u_i\}}\underline{g}_k](t) = [T\underline{g}_k](t) = \frac{1}{\lambda\{U\}} \int_U [\chi_{(-\infty,t]} \circ \underline{g}_k](x)d\lambda(x).$$

Recall that $\{\underline{g}_k\}$ satisfies $(\chi_{(-\infty,t]} \circ \underline{g}_k) \to (\chi_{(-\infty,t]} \circ g)$ a.e. for all t. Hence, Lebesgue's bounded convergence theorem may be employed to show that $$\lim_{k \to \infty}[T^{\{u_i\}}\underline{g}_k](t) = \lim_{k \to \infty} \frac{1}{\lambda\{U\}} \int_U [\chi_{(-\infty,t]} \circ \underline{g}_k](x)d\lambda(x) =$$
$$\frac{1}{\lambda\{U\}} \int_U [\chi_{(-\infty,t]} \circ g](x)d\lambda(x) = [T^{\{u_i\}}g](t)$$

for all t. That is, we have $$\lim_{k \to \infty} T^{\{u_i\}}\underline{g}_k = T^{\{u_i\}}g.$$

Since $[T^{\{u_i\}}\underline{g}_k](t-\tau) \cdot f_\eta(\tau) \leq f_\eta(\tau)$ and $f_\eta$ is integrable, the dominated convergence theorem may used to show that $$\lim_{k \to \infty}[[T^{\{u_i\}}\underline{g}_k] * f_\eta](t) = \lim_{k \to \infty} \int_{-\infty}^{\infty} [T^{\{u_i\}}\underline{g}_k](t-\tau) \cdot f_\eta(\tau)d\tau =$$
$$\int_{-\infty}^{\infty} [T^{\{u_i\}}g](t-\tau) \cdot f_\eta(\tau)d\tau = [[T^{\{u_i\}}g] * f_\eta](t)$$

for all t.

Lastly, we evaluate (2.42) as $k \to \infty$ to conclude that $$\lim_{k \to \infty} T^{\{u_i\}}\underline{h}_k = \lim_{k \to \infty} [T^{\{u_i\}}\underline{g}_k] * f_\eta = [T^{\{u_i\}}g] * f_\eta. \quad (2.45)$$

Similar derivations show that $$\lim_{k \to \infty} T^{\{u_i\}}\bar{h}_k = \lim_{k \to \infty} [T^{\{u_i\}}\bar{g}_k] * f_\eta = [T^{\{u_i\}}g] * f_\eta. \quad (2.46)$$

Thus, by taking the limit $k \to \infty$ in (2.44), we can conclude that the limit $$T^{\{u_i\}}h = \lim_{n\to\infty} T_n^{\{u_i\}}h$$

exists and $$[T^{\{u_i\}}h](t) = ([T^{\{u_i\}}g] * f_\eta)(t) \text{ a.s.}$$

for all t. Moreover, notice that since both $T^{\{u_i\}}h$ and $[T^{\{u_i\}}g]*f_\eta$ are distribution functions bounded by 1, we have that for all t, $$|[T^{\{u_i\}}h](t) - ([T^{\{u_i\}}g]*f_\eta)(t)| \leq 2.$$

Therefore, by using Lebesgue's bounded convergence theorem, we may also conclude that $$[T^{\{u_i\}}h](t) = ([T^{\{u_i\}}g]*f_\eta)(t) \text{ in } L_p(\Omega)\text{-norm}, 1 \leq p < \infty,$$

for all t, which completes the proof.

2(e) Estimation of Radiometry and Geometry in the Presence of Noise

With the results obtained in the last section we may return to discuss the original joint geometric-radiometric estimation problem in the presence of noise:

Given the known function g and a single measurement (observation) h of the form $$h(x) = [Q \circ g \circ A](x) + \eta(x) \quad (2.47)$$

for all $x \in \text{supp}\{Q \circ g \circ A\}$, find an estimate for the left-hand composition Q and the affine transformation A.

To proceed, let us assume that $g \in R_c(R^m)$ and that the random field $\{\eta(x): x \in R^m\}$ admits a probability density function $f_\eta$ (i.e., the random field $\{\eta(x): x \in R^m\}$ has an absolutely continuous probability distribution).

According to Lemma 4, $Q \circ g \circ A$ is in $R_c(R^m)$ as well. Let $\{u_i\}_{i=1}^\infty$ be a $\lambda$-u.d. sequence in $\text{supp}\{Q \circ g \circ A\}$.

In this setting, Theorem 7 may be employed to obtain $$T^{\{u_i\}}h = [T^{\{u_i\}}(Q \circ g \circ A)] * f_\eta \text{ a.s.} \quad (2.48)$$

Since $(Q \circ g \circ A) \in R_c(R^m)$, according to Lemma 2 we have $$T^{\{u_i\}}(Q \circ g \circ A) = T(Q \circ g \circ A).$$

Therefore, Corollary 2 may be invoked to obtain $$T(Q \circ g \circ A) = [Tg] \circ Q^{-1}.$$

Thus, (2.48) becomes $$T^{\{u_i\}}h = ([Tg] \circ Q^{-1}) * f_\eta \text{ a.s.} \quad (2.49)$$

Hence, The following corollary may now be stated:

Corollary 8. Let $H(t) = [T^{\{u_i\}}h](t)$ and $G(t) = [Tg](t)$. Then, for all $t \in R$ the following relation almost surely holds $$H(t) = [(G \circ Q^{-1}) * f_\eta](t). \quad (2.50)$$

The stochastic relation expressed in (2.21) describes a noisy observation about a template deformed both geometrically and radiometrically. Using the transformation T we have (almost surely) "converted" this stochastic relation to a new deterministic functional relation. This relation is expressed by a right-hand composition $Q^{-1}$ (i.e., a deformation of coordinates), followed by the action of an LTI system. Interestingly, the impulse response of this LTI system is given by $f_\eta$, which represents the statistics of the random field $\eta$.

In fact, notice that Corollary 8 is a generalization of Corollary 2 (obtained for the noiseless case). Indeed, in the case where $\eta$ vanishes, $f_\eta = \delta$ (in the sense of an atomic measure concentrated in zero) and thus (2.50) reduces to the result obtained in Corollary 2. Hence, in order to estimate the left-hand composition Q, the original stochastic registration problem can be replaced, with probability one, by a "new" deterministic one.

From a "classic" estimation theory point of view, this deterministic problem has the form of a deconvolution problem. Solution of the deconvolution problem reduces (2.50) to the form (1.6) derived for the noise-free case. Thus, as in the noiseless case, the original problem may then be solved in two stages (section 1). Also note that (2.50) implies robustness of the noiseless algorithm when applied to a measurement of high signal to noise ratio. The high SNR case can be characterized by a probability density function $f_\eta$ that approximates the Dirac delta function. Thus, in high SNR, (2.50) naturally reduces to the noiseless equation (1.6), and Q may be estimated as before, as we demonstrate in section 3.

On the other hand, one may ask whether it is necessary to employ deconvolution in order to solve (2.50) for the unknown transformation $Q^{-1}$? Possibly, the latter may be "accessed" without explicitly restoring the function $(G \circ Q^{-1})$.

In fact, this question turns out to be extremely important, especially in practice. As $f_\eta$ is the probability density function of the noise process $\eta$, it is not bounded from below and thus an inverse filter does not exist. Moreover, exact equality in (2.50) is only obtained asymptotically, whereas in practice small perturbations may occur (see section 1 for more details). Hence, any attempt to perform deconvolution (e.g., pseudo-inverse, truncated inverse, etc.) will result in severe instabilities, leading to model mismatches and large estimation errors.

Nevertheless, as we show in the following, with fairly weak assumptions, it is possible to solve (2.50) for the unknown transformation $Q^{-1}$ without explicitly restoring the function $(G \circ Q^{-1})$ by means of deconvolution.

In order to do so, we exploit the monotone nature of (2.50). Namely, since H and G are distribution functions, they are invertible (possibly in a weak sense, e.g., their pseudo-inverse may be defined). We shall assume that the function G is invertible on its domain of variation; that is, that $G|_{0 < G < 1}$ is a continuous strictly increasing function. Throughout, restrictions to the domain of invertibility will be omitted in order to simplify the notations.

The method we propose is based on a duality property of left and right compositions applied to monotone functions. More explicitly, since G is invertible, there exists an invertible function W such that $$G \circ Q^{-1} = W \circ G. \quad (2.51)$$

Figure 6:
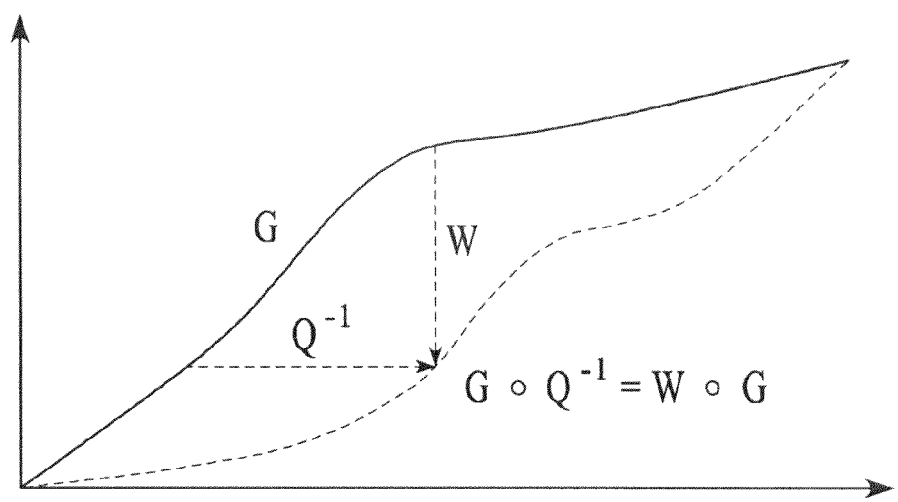
FIG. 6 illustrates the duality property of left-right compositions applied to monotone functions.

Namely, set $W(t) = G(Q^{-1}(G^{-1}(t)))$. In other words, as demonstrated in FIG. 6, since G is increasing, any (continuous and increasing) deformation of its domain (right hand composition with $Q^{-1}$) may be equivalently reproduced by applying a non-linear mapping to the range of G (left hand composition with W). Hence, instead of recovering (estimating) Q it is sufficient to recover W.

To proceed, we endow W with a linear model. W is in $L_2((0,1))$ and thus can be represented as $$W(t) = \sum_i b_i e_i(t), \quad (2.52)$$

where $\{e_i\}$ is a countable basis of $L_2((0,1))$. Hence, (2.51) may be rewritten as $$G \circ Q^{-1} = \left(\sum_i b_i e_i\right) \circ G = \sum_i b_i (e_i \circ G), \quad (2.53)$$

where the last equality is due to associativity.

Therefore, using (2.53) we find that (2.50) becomes $$H = (G \circ Q^{-1}) * f_\eta \qquad (2.54)$$
$$= \left(\sum_i b_i [e_i \circ G]\right) * f_\eta = \sum_i b_i ([e_i \circ G] * f_\eta),$$

where the last equality holds under the assumption of W admitting a finite expansion in (2.52).

That is, the functional equation (2.50) in $Q^{-1}$ may be reformulated as a linear parametric problem. Equation (2.54) may easily be solved for the unknown coefficients $\{b_i\}$; as $(e_i \circ G)$ may be easily calculated and (2.54) holds for all t, a linear system of equations may be constructed by choosing different t's.

Namely, let M denote the model order of the expansion of W in (2.52). Then for $t_1, t_2, \ldots, t_N \in \mathrm{supp}\{(H|_{0 < H < 1})^{-1}\}$ the following linear system is obtained $$\begin{bmatrix} H(t_1) \\ \vdots \\ H(t_N) \end{bmatrix} = \begin{bmatrix} ([e_1 \circ G] * f_\eta)(t_1) & \cdots & ([e_M \circ G] * f_\eta)(t_1) \\ \vdots & & \vdots \\ ([e_1 \circ G] * f_\eta)(t_N) & \cdots & ([e_M \circ G] * f_\eta)(t_N) \end{bmatrix} \begin{bmatrix} b_1 \\ \vdots \\ b_M \end{bmatrix}. \qquad (2.55)$$

Employing linear least squares ($N \geq M$) shall then provide us with an estimate for the unknown coefficients $\{b_i\}$.

Once W has been determined, in terms of its parameters $\{b_i\}$, Q may be directly calculated by noticing that $$Q(t) = G^{-1}(W^{-1}(G(t))). \qquad (2.56)$$

Having estimated Q, we can now return to the original problem (2.21) in order to estimate the geometric transformation A. Equation (2.21) may be rewritten as $$h = \underbrace{(Q \circ g)}_{\text{known}} \circ A + \eta. \qquad (2.57)$$

Hence, the problem reduces to a strictly geometric registration problem in the presence of additive measurement noise. In section 1(b) we have outlined an explicit solution method to such registration problem in the noiseless case; it was based on a non-linear method for constructing linear constraints in the unknown parameters of the affine transformation A. The same method may also be applied in the case of noisy measurements; in R. Hagege and J. M. Francos, Parametric estimation of multi-dimensional affine transformations in the presence of noise: a linear solution, In *Proc. IEEE/SP 13th Workshop on Statistical Signal Processing*, pages 55-58, 2005, a stochastic estimation problem of the type (2.57) is analyzed, and a method for constructing unbiased optimal constraints is derived; again, the solution is obtained by simply solving a linear system of equations (or more accurately by solving an over-determined system of constraints as a linear least squares problem).

3. Experimental Results and Summary

This section presents experimental results obtained using the methods proposed in sections 1 and 2. The applicability and performance of the proposed methods are demonstrated using synthetic and natural data.

3(a) Implementation Remarks

Throughout, we have considered images as functions over a continuous domain (coordinates). Due to the inherent physical properties of the problem, it is natural to model and solve it in the continuous domain. Inherently, the mapping A of $R^m$ into itself is of a continuous nature, as is the physical phenomenon of geometric deformation of real-life objects it represents. Thus, if we impose a discrete model (e.g., $x \in Z^m$), we find that, in general, the natural A to consider is incompatible (as for "almost all" $x \in Z^m$, $A(x) \notin Z^m$). In practice, in order to apply the proposed methods to digital images we utilized an approximated discrete form of each expression, by a straightforward replacement of the integrals by their corresponding finite sums.

For example, in practice, the sample distribution transformation T, defined in (1.3), is replaced with the following discrete approximation:

$$[Th](t) = \frac{\#\{(i,j) : 0 < h(i,j) \leq t\}}{\#\{(i,j) : h(i,j) > 0\}}. \qquad (3.58)$$

$[Th](t)$ is then only calculated on the finite range of h (e.g., $t = 0, 1, \ldots, 255$ in the common case of 8-bit images). Other expressions are similarly discretized.

Obviously, using such discrete approximation introduces errors and model mismatches. However, the high resolution of typical (optical) digital imaging allows for these errors to be reasonably small, and satisfactory estimation results are obtained. Moreover, a rigorous analysis of the errors introduced in the estimation of the geometric deformation due to sampling and quantization (in (1.12) and (1.18)) is possible, and methods for minimizing these errors are available. Since the problem of joint geometric-radiometric estimation has been decoupled into two strictly geometric estimation problems (section 1(b)(iii)), these methods may be directly exploited to improve upon the performance of the joint estimation algorithm proposed in this disclosure.

In the computational aspect, carefully going through the derivations above shows that the overall complexity of the proposed joint geometric-radiometric estimation method is $O(N^2)$ for an image of dimensions $N \times N$. This is due to the fact that the estimation procedure is essentially comprised of pointwise operations and summations applied to, at most, the image pixels themselves, and the solution of low-dimensional linear systems of equations; other computations (such as these employed to the sample distributions) are computationally negligible for large N.

3(b) Noiseless vs. Noisy—Radiometry Estimation Performance Comparison

We have proposed a method for estimating the unknown non-linear deformation Q in the presence of additive noise. On the other hand, we have also shown the robustness of the method derived for the noiseless case (i.e., the method presented that does not take the noise into account) in high SNR. It is then natural to compare the performance of both estimation schemes.

A simple comparison has been conducted in the estimation of the radiometric non-linearity Q. The template image, g, was taken to be a gray-scale version of the "flaming fractal" used in the previous example. Sequences of Monte Carlo experiments were performed at various SNRs (−10 dB÷80 dB). The observations, h, were generated by applying to g a non-linear mapping of the intensities $Q(t) = t^2$ followed by the addition of a zero mean white Gaussian noise with the appropriate variance.

Figure 7:
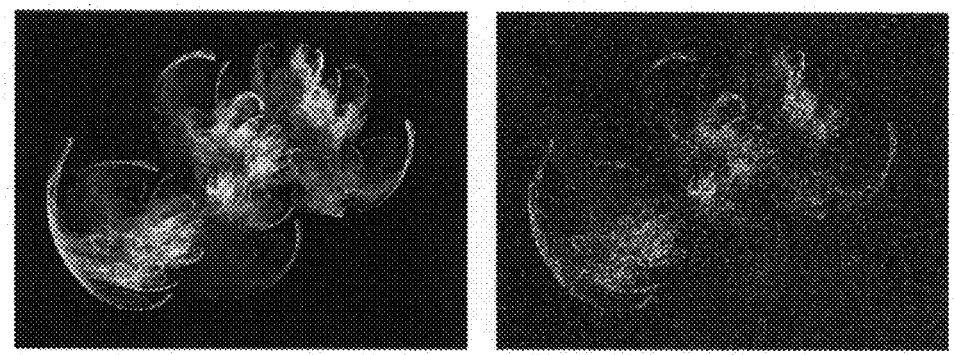
FIG. 7 shows the template (left) and a sample observation (right) at −3 dB.
Figure 8:
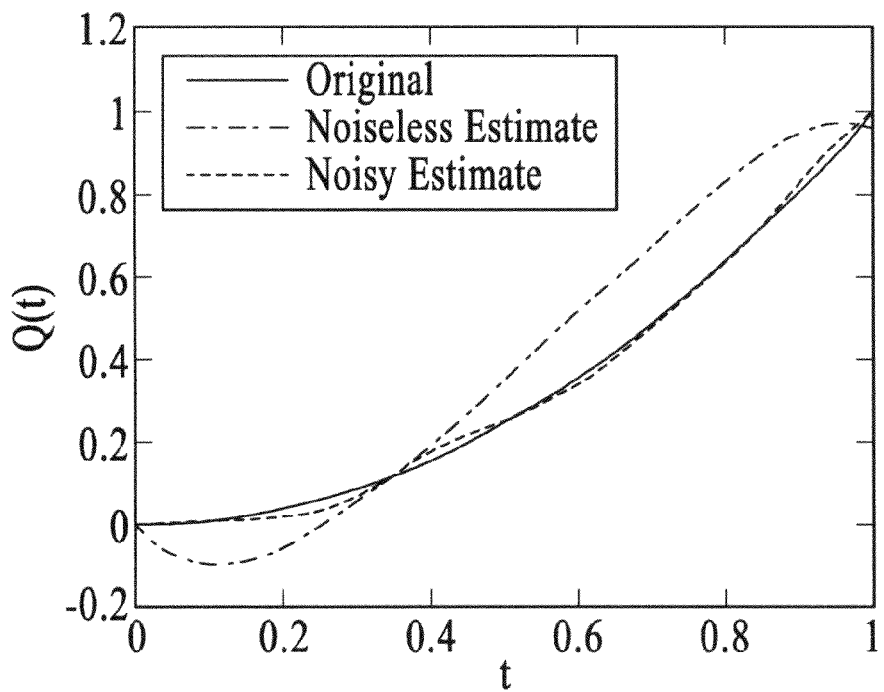
FIG. 8 shows the radiometric deformation Q and its estimates (based on a single realization). Estimates were obtained by using the solution under the assumption that the observation is noisefree (dashed-dotted line), and by the estimator obtained under the assumption that the observations are noise corrupted (dashed line).

As an example, FIG. 7 shows a sample template and observation at −3 dB. The radiometric deformation Q and its estimates are shown in FIG. 8.

Figure 9:
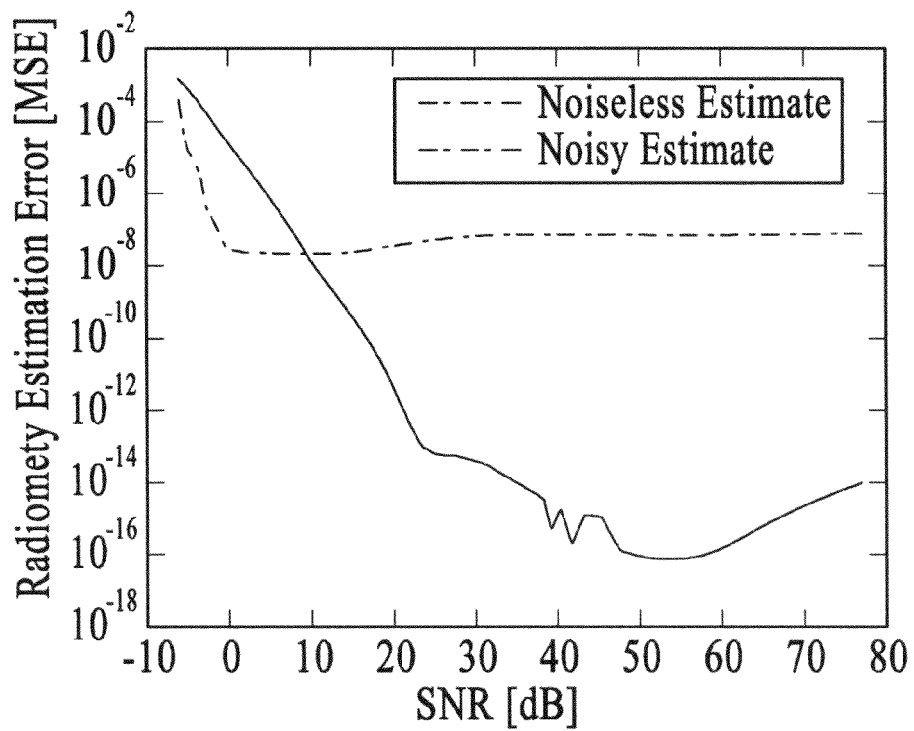
FIG. 9 shows a radiometry estimation—performance comparison.

The radiometry estimation errors (MSE) of both methods are shown in FIG. 9. Clearly, the method designed for the noisefree case outperforms at high and moderate SNRs. This is due to the numerical overhead of the estimator designed for the additive noise model and the errors it introduces; for example, calculating (2.56) in practice involves the inversion of sampled functions, which largely account for the degraded performance. The noisefree solution method, which is much less computationally demanding, may therefore be used even in the presence of noise. However, in cases of low SNR (less than 10 dB), taking the noise into account is crucial and the estimator designed under the noisy observation assumption outperforms.

3(c) Overall Performance—Noiseless Method

We examine the overall performance and robustness of the joint estimation method derived under the noiseless model assumption, in the case where in fact the observations are noisy, but the SNR is high. As mentioned earlier, this method is much less computationally demanding, and thus, may be more appealing to utilize.

The experiment was conducted in the same setting as the example above. Sequences of Monte Carlo experiments were performed at various SNRs (20 dB÷45 dB). The observations h were generated as above, and a zero mean white Gaussian noise with the appropriate variance was added.

Remark 1. On an image with 256 intensity levels (8-bit) per channel, the additive white Gaussian noise was chosen to have an STD equivalent to 0.5÷15 levels. In experiments, well-exposed images taken with several digital cameras (Nikon Coolpix 8700, Canon S2ISand Canon EOS-1dMkIII), have exhibited an inherent noise with STD equivalent to 0.5÷2 levels.

Remark 2. The SNR was calculated as the RMS SNR across the 3 color channels.

As before $Q_R$, $Q_G$ and $Q_B$ were individually estimated by applying the proposed algorithm to each of the image channels. As expected, in lower SNR the mismatch of the algorithm derived for the noisefree case is no longer negligible, and a slight bias in the estimation of $Q_R$, $Q_G$ and $Q_B$ is introduced. Nevertheless, estimation errors (MSE) were quite small ($\approx 10^{-5}$ in the low SNR experiments). It should be noted that the estimation variance was practically zero, in correspondence with the strong consistency of the left hand composition estimation procedure, expressed in (2.50); hence, the MSE is mostly comprised of a deterministic bias, due to the mismatch between the no-noise assumption of the solution and the existence of noise in the actual observations.

Figure 10:
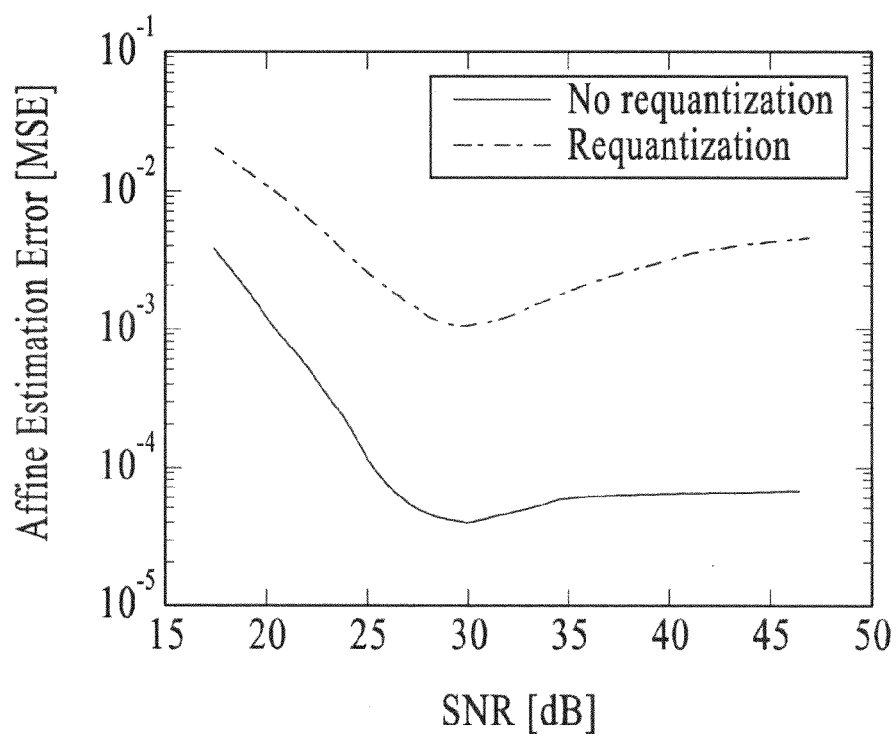
FIG. 10 shows the error in estimating the affine deformation A.

Next, the estimation procedure for the affine deformation A outlined above was applied. The estimation errors (MSE, in the sense previously defined) are shown in FIG. 10. As before, the estimation variance was practically zero; hence, again the MSE is mostly comprised of a deterministic bias, due to the imperfect estimation of the radiometric deformation.

In order to illustrate the effects of quantization on the performance, we repeated the Monte Carlo experiment, this time in a more "realistic" setting. We requantized the observation image h, to 256 uniformly spaced levels. The estimation results of the affine deformation are also shown in FIG. 10. As expected, results are slightly worse than in the continuous (unquantized) case, yet not significantly.

Interestingly, somewhat better results are exhibited at SNR≈30 dB. This can be informally explained as follows: the entire estimation method strongly depend on the sample distribution. Obviously, this distribution is severely corrupted by quantization. In a sense, the perturbations introduced by the noise compensate for the loss of information caused by the requantization, leading to a better approximation of Th, the "empirical distribution" of h. As mentioned above, further discussion of the implications of requantization is out of scope of this disclosure.

3(d) Concluding Experiment

Figure 11:
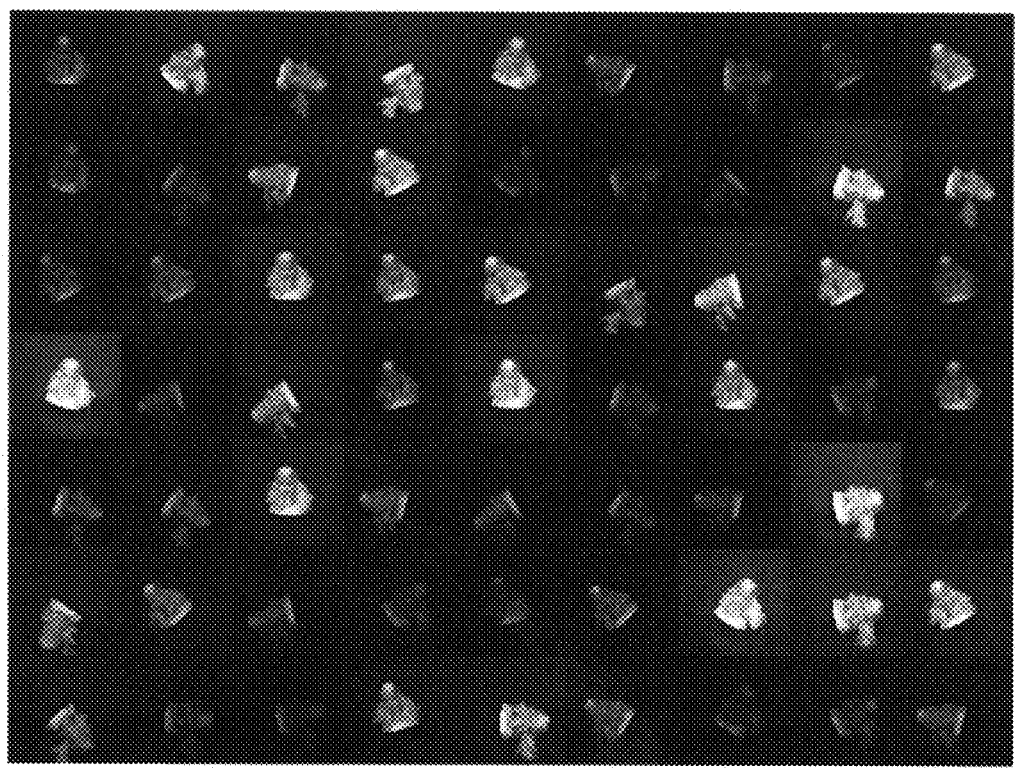
FIG. 11 shows a sample of the experiment dataset. A total of over 10,000 images were collected at different combinations of geometry (rotation angle) and radiometry (illumination power and shutter speed). The chosen template image is shown at the center.

As a concluding experiment, we tested the applicability of the proposed method to real optical images. Images of a doll's head were acquired using a computer controlled digital camera (Canon S2IS). The acquired RGB images were of dimensions 2592×1944 at 8-bit per channel. A total of over 10,000 images were collected at different combinations of geometry (rotation angle) and radiometry (illumination power and shutter speed). Sample images are shown in FIG. 11 and FIG. 12.

A computer controlled motorized arm has rotated the doll's head in a plane approximately perpendicular to the camera's optical axis; rotation angles ranged from −150 to 150 degrees. The illumination power and camera's shutter speed were also controlled; illumination power ranged from 35% to 100%, and shutter speed ranged from 1/1600 to 0.6 seconds. Changing the illumination power and shutter speed globally affect intensity levels in the acquired image, where overall measurement non-linearities are inherently introduced by the camera. Moreover, changing the illumination power also alters the light's spectrum, possibly intensifying such global non-linear effects. In practice, we separately associated a non-linear mapping with each of the image color channels, that is, $Q_R$, $Q_G$ and $Q_B$ as in the previous examples.

Figure 12:
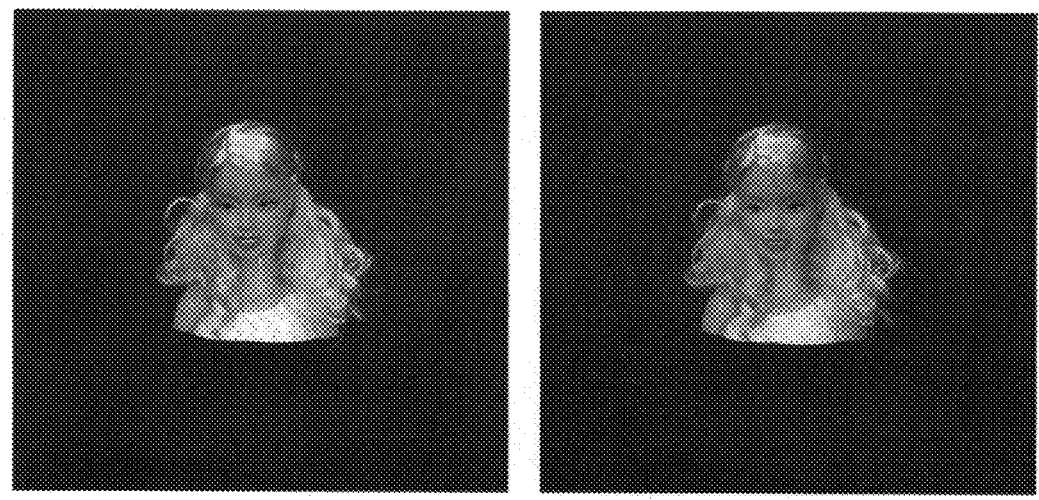
FIG. 12 illustrates a pair of images taken at different illumination power and shutter speed settings. 78% @ 0.01 sec. (left) 48% @ 0.3 sec. (right).
Figure 13:
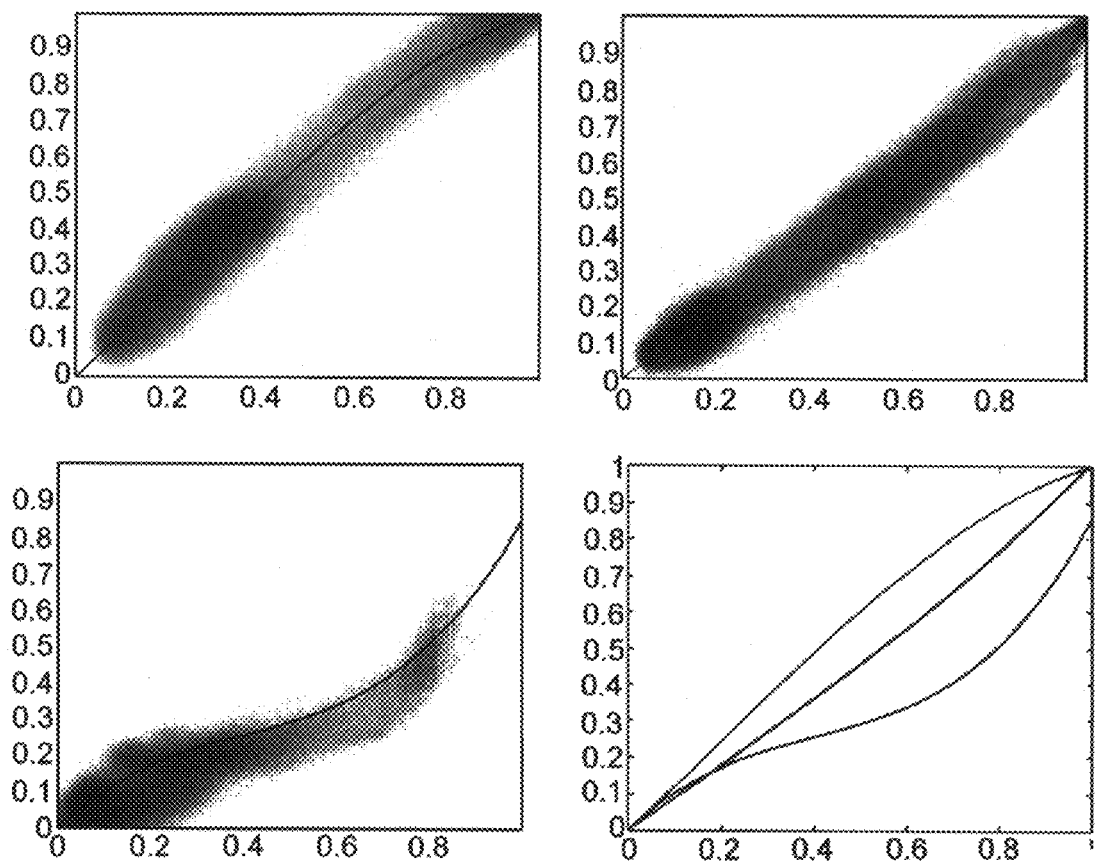
FIG. 13 shows the joint histograms and estimates of $Q_R$, $Q_G$ and $Q_B$ of a pair of images taken at different illumination power and shutter speed settings. In the bottom-right are plotted the estimates $Q_R$, $Q_G$ and $Q_B$.

To validate our modeling assumption on the radiometric model, we examined pairs of images taken at the same rotation angle, but with different illumination power and shutter speed settings (see FIG. 12). We then plotted the joint histogram (comparagram) of each pair (for each color channel). The joint histogram of two images is defined as the matrix whose (n,m) entry is the number of pixels that simultaneously assume the value n in the first image and m in the second one. Recall that each pair of images is geometrically registered; hence, had there been a non-linear function Q radiometrically relating each pair, the joint histogram of the pair should exactly follow the graph of Q. Conversely, if the joint histogram of such pair seems to follow a graph (a curve) then there is (approximately) a global non-linear intensity mapping relating the pair. Finally, we applied the method derived above to estimate $Q_R$, $Q_G$ and $Q_B$, and overlaid the estimates on the joint histograms of each channel (see FIG. 13). The results strongly suggested that the type of global radiometry considered in this paper is indeed a good approximation to the radiometric effects evident in the collected data.

Finally, we used the joint estimation method proposed in this paper to estimate the rotation angle. First, a template image has been selected (see the marked image in the center of FIG. 11). For each image in the dataset, the radiometric functions $Q_R$, $Q_G$ and $Q_B$ were estimated, and a radiometric-registered image was calculated. Finally, the affine estimation procedure was applied, and the corresponding rotation angle calculated. The overall angular estimation had a bias of $3.2 \cdot 10^{-6}$ degrees with a standard deviation of 1.41 degrees.

Furthermore, the overall estimation procedure has shown substantial stability to various real-life model mismatches evident in this experiment; among such are projective geometry (as we could not perfectly align the camera and the three dimensional object), non-uniform illumination (due to the light source), shadows, occlusions and other un-modeled perturbations (such as movements of the doll's hair). On the other hand, an attempt to directly use the geometry estimation procedure on the original data has failed.

3(e) Summary and Concluding Remarks

In the previous sections we have proposed a novel method for jointly estimating the geometric and radiometric deformations relating two observations on the same object. The case of a geometric affine transformation relating the images' coordinate systems, and a non-linear function relating the intensities of the two images has been modeled.

In section 1, we derived a solution for the noiseless case. We have shown that by using the sample distribution transformation T, the joint estimation problem may be decoupled into two simpler problems in the unknown radiometry and unknown geometry. More specifically, we have shown that the original high-dimensional non-linear non-convex search problem of simultaneously recovering the geometric and radiometric deformations can be represented by an equivalent sequence of two linear systems. A solution of this sequence yields an exact, explicit and efficient solution to the joint estimation problem, regardless of the deformations' magnitudes. In Section 2, we have further extended the solution to the case of noisy measurements. As in the noiseless case, we have derived a method for replacing the original problem with an almost surely equivalent sequence of two linear systems. Moreover, we have shown the robustness of the method derived for the noiseless case in the presence of noise for high SNR. Numerical performance analysis and synthetic examples as well as experiments with natural images have been presented in section 3.

The estimations described in this discussion may be implemented with any images, regardless of how they are captured. The estimations may be made using any computer hardware and software programs capable of implementing and performing the required calculations.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method for estimating the joint radiometric and geometric deformations of an image of an object using a radiometry-first approach comprising:
   (a) analyzing a first observation h of an image, about a known m-dimensional signal g, of the form $h(x)=Q(g(A(x)))+\eta(x)=Q \circ g \circ A+\eta,$ where Q is a non-linear mapping of the intensities (radiometry), A is an affine (geometric) transformation, and $\eta$ is an additive noise;
   (b) estimating the joint radiometric and geometric deformations of the first observation without limitations on the magnitude of the geometric or radiometric deformations; and
   (c) analyzing the deformations of the first observation in comparison to a second observation of an object to determine whether the first observation and the second observation are of the same object; wherein
   (i) the sample distribution transformation T is invariant under right-hand affine compositions: $T(g \circ A)=Tg$, and $T(W \circ g)=[Tg] \circ W^{-1}$ for any strictly increasing continuous function $W:R \rightarrow R$ such that $W(0)=0$;
   (ii) applying T to the (noiseless) relation $h=Q \circ g \circ A$, to obtain $Th=[Tg] \circ Q^{-1}$;
   (iii) using the transformation T to convert a functional relation expressed by a left-hand composition ("radiometric deformation") into a new functional relation expressed by a right-hand composition ("geometric deformation") so equation $H(t)=[G \circ Q^{-1}](t)=G(Q^{-1}(t))$ describes a new, one-dimensional, "time-domain" registration problem and any suitable (parametric or non-parametric) registration method may be used to recover (estimate) $Q^{-1}$;
   (iv) producing linear constraints on Q, enabling the explicit recovery of $Q^{-1}$ in terms of solving a linear system of equations, as follows:

$$\int_R w o \tilde{H} = \left[ \int_R e_1(w o \tilde{G}) L \int_R e_M(w o \tilde{G}) \right] \begin{bmatrix} b_1 \\ \vdots \\ b_M \end{bmatrix}$$

(v) once the radiometric deformation Q (or equivalently its inverse $Q^{-1}$) is recovered, rewriting $h=Q \circ g \circ A$, as $$h = \underbrace{(Q \circ g)}_{known} \circ A;$$

and
   (vi) reducing the problem to a strictly geometric problem where A is recovered.

2. A method for estimating the joint radiometric and geometric deformations of an image of an object using a geometry-first approach comprising:
   (a) analyzing a first observation h of an image, about a known m-dimensional signal g, of the form $h(x)=Q(g(A(x)))+\eta(x)=Q \circ g \circ A+\eta,$ where Q is a non-linear mapping of the intensities (radiometry), A is an affine (geometric) transformation, and $\eta$ is an additive noise;
   (b) estimating the joint radiometric and geometric deformations of the first observation without limitations on the magnitude of the geometric or radiometric deformations; and
   (c) analyzing the deformations of the first observation in comparison to a second observation of an object to determine whether the first observation and the second observation are of the same object; wherein
   (i) the sample distribution transformation T is invariant under right-hand affine compositions: $T(g \circ A)=Tg$, and $T(W \circ g)=[Tg] \circ W^{-1}$ for any strictly increasing continuous function $W:R \rightarrow R$ such that $W(0)=0$;
   (ii) defining $Rh=[Th] \circ h-[Th](0)$, and letting $H(x)=[Rh](x)$ and $G(x)=[Rg](x)$, then, for all $x \in R^m$ the following relation holds $H(x)=G(A(x))$, whereby R has converted the joint problem $h=Q \circ g \circ A$, in the unknowns Q and A, to a "new" problem in a single unknown, A, and by applying the operator R we have eliminated the left composition Q, representing the radiometric deformation, in the basic relation $h=Q \circ g \circ A$, whereby $H(x)=[G \circ A](x)=G(A(x))$ describes a new, strictly geometric, affine registration problem, and a registration method may be used to recover (estimate) A, to produce a linear solution for A; and
   (iii) once the geometric transformation A is determined, $h=Q \circ g \circ A$, may be rewritten as $$h = Q \circ \underbrace{(g \circ A)}_{known},$$

whereby the problem reduces to a strictly radiometric problem, where Q is recovered.

3. A method for estimating the joint radiometric and geometric deformations of an image of an object using a parallel registration approach comprising:
 (a) analyzing a first observation h of an image, about a known m-dimensional signal g, of the form $$h(x) = Q(g(A(x))) + \eta(x) = Q \circ g \circ A + \eta,$$

where Q is a non-linear mapping of the intensities (radiometry), A is an affine (geometric) transformation, and $\eta$ is an additive noise;
 (b) estimating the joint radiometric and geometric deformations of the first observation without limitations on the magnitude of the geometric or radiometric deformations; and
 (c) analyzing the deformations of the first observation in comparison to a second observation of an object to determine whether the first observation and the second observation are of the same object; wherein
 (i) the sample distribution transformation T is invariant under right-hand affine compositions: $T(g \circ A) = Tg$ and $T(W \circ g) = [Tg] \circ W^{-1}$ for any strictly increasing continuous function $W: \mathbb{R} \to \mathbb{R}$ such that $W(0) = 0$;
 (ii) $h = Q \circ g \circ A$, is symmetrically decoupled into two strictly geometric problems in each of the unknowns $[Th] = [Tg] \circ Q^{-1}$, $[Rh] = [Rg] \circ A$, so a solution to the joint problem is obtained by separately solving the latter two problems for the unknowns $Q^{-1}$ and A, respectively; and
 (iii) explicit parametric solution methods are derived.

4. The method of claim 1, wherein the estimation is in the presence of noise, further comprising:
 (a) letting $H(t) = [T^{\{u_i\}} h](t)$ and $G(t) = [Tg](t)$; and
 (b) using $$H = [(G \circ Q^{-1}) * f_\eta] = \sum_i b_i ([e_i \circ G] * f_\eta),$$

where $f_\eta$ is the probability density of the noise, solving this linear system for the coefficients $b_i$, to obtain $$h = \underbrace{(Q \circ g)}_{known} \circ A + \eta \ldots$$

5. The method of claim 2, wherein the estimation is in the presence of noise, further comprising:
 (a) letting $H(t) = [T^{\{u_i\}} h](t)$ and $G(t) = [Tg](t)$; and
 (b) using $$H = [(G \circ Q^{-1}) * f_\eta] = \sum_i b_i ([e_i \circ G] * f_\eta),$$

where $f_\eta$ is the probability density of the noise, solving this linear system for the coefficients $b_i$, to obtain $$h = \underbrace{(Q \circ g)}_{known} \circ A + \eta \ldots$$

6. The method of claim 3, wherein the estimation is in the presence of noise, further comprising:
 (a) letting $H(t) = [T^{\{u_i\}} h](t)$ and $G(t) = [Tg](t)$; and
 (b) using $$H = [(G \circ Q^{-1}) * f_\eta] = \sum_i b_i ([e_i \circ G] * f_\eta),$$

where $f_\eta$ is the probability density of the noise, solving this linear system for the coefficients $b_i$, to obtain $$h = \underbrace{(Q \circ g)}_{known} \circ A + \eta.$$

\* \* \* \* \*